US012780975B2

(12) United States Patent
Riazzi et al.

(10) Patent No.: US 12,780,975 B2
(45) Date of Patent: Nov. 3, 2026

(54) PACKAGING COATING SYSTEM

(71) Applicant: SWIMC LLC, Cleveland, OH (US)

(72) Inventors: Arthur Riazzi, Harrison City, PA (US); Mary E. Tishey, Valencia, PA (US); George K. Bartley, III, Burgettstown, PA (US); Richard H. Evans, Wexford, PA (US)

(73) Assignee: SWIMC LLC, Cleveland, OH (US)

( * ) Notice: Subject to any disclaimer, the term of this patent is extended or adjusted under 35 U.S.C. 154(b) by 727 days.

(21) Appl. No.: 17/779,387

(22) PCT Filed: Dec. 1, 2020

(86) PCT No.: PCT/IB2020/061296
§ 371 (c)(1),
(2) Date: May 24, 2022

(87) PCT Pub. No.: WO2021/105970
PCT Pub. Date: Jun. 3, 2021

(65) Prior Publication Data

US 2023/0092917 A1 Mar. 23, 2023

Related U.S. Application Data

(60) Provisional application No. 62/941,013, filed on Nov. 27, 2019.

(51) Int. Cl.

| | |
|---|---|
| ***C08G 4/00*** | (2006.01) |
| ***B05D 7/14*** | (2006.01) |
| ***B65D 25/34*** | (2006.01) |
| ***B65D 65/40*** | (2006.01) |
| ***C08G 18/42*** | (2006.01) |
| ***C08G 18/73*** | (2006.01) |
| ***C08G 18/75*** | (2006.01) |
| ***C08G 59/14*** | (2006.01) |
| ***C08G 59/20*** | (2006.01) |
| ***C08G 59/26*** | (2006.01) |
| ***C09D 167/02*** | (2006.01) |
| ***C09D 167/04*** | (2006.01) |
| ***C09D 175/06*** | (2006.01) |

(52) U.S. Cl.
CPC ........... *C08G 4/00* (2013.01); *C08G 59/1433* (2013.01); *C08G 59/20* (2013.01); *C08G 59/26* (2013.01); *C09D 167/04* (2013.01); *C08G 2150/00* (2013.01); *C08G 2390/40* (2013.01)

(58) Field of Classification Search
None
See application file for complete search history.

(56) References Cited

U.S. PATENT DOCUMENTS

| | | | |
|---|---|---|---|
| 2,633,458 | A | 3/1953 | Shokal |
| 3,943,187 | A | 3/1976 | Wu |
| 3,978,087 | A | 8/1976 | Renner et al. |
| 4,076,676 | A | 2/1978 | Sommerfeld |
| 4,212,781 | A | 7/1980 | Evans et al. |
| 4,247,439 | A | 1/1981 | Matthews et al. |
| 4,285,847 | A | 8/1981 | Ting |
| 4,413,015 | A | 11/1983 | Anderson et al. |
| 4,446,258 | A | 5/1984 | Chu et al. |
| 4,517,322 | A | 5/1985 | Birkmeyer et al. |
| 4,963,602 | A | 10/1990 | Patel |
| 5,296,525 | A | 3/1994 | Spencer |
| 5,527,840 | A | 6/1996 | Chutko et al. |
| 5,830,952 | A | 11/1998 | Pedersen et al. |
| 5,922,817 | A | 7/1999 | Pedersen et al. |
| 7,037,584 | B2 | 5/2006 | Wind et al. |
| 7,189,787 | B2 | 3/2007 | O'Brien et al. |
| 8,129,495 | B2 | 3/2012 | Evans et al. |
| 8,574,672 | B2 | 11/2013 | Doreau et al. |
| 9,200,176 | B2 | 12/2015 | Skillman et al. |
| 9,409,219 | B2 | 8/2016 | Niederst et al. |
| 9,598,602 | B2 | 3/2017 | Kuo et al. |
| 9,650,176 | B2 | 5/2017 | Cavallin et al. |
| 10,435,199 | B2 | 10/2019 | Niederst et al. |
| 10,526,277 | B2 | 1/2020 | Gibanel et al. |
| 10,793,742 | B2 | 10/2020 | Prouvost et al. |
| 10,875,076 | B2 | 12/2020 | Scott |
| 11,130,835 | B2 | 9/2021 | Evans et al. |
| 11,248,127 | B2 | 2/2022 | Joslin et al. |
| 2002/0010309 | A1 | 1/2002 | Oguro |
| 2005/0196629 | A1 | 9/2005 | Bariatinsky et al. |

(Continued)

FOREIGN PATENT DOCUMENTS

| | | | |
|---|---|---|---|
| CN | 102257031 | A | 11/2011 |
| CN | 105899571 | A | 8/2016 |

(Continued)

OTHER PUBLICATIONS

Chinese Office Action for CN Application No. 202080081765.6, issued by the Chinese Patent Office on Jul. 18, 2024; 28 pgs. including English translation.

(Continued)

*Primary Examiner* — Ha S Nguyen

(74) *Attorney, Agent, or Firm* — Mueting Raasch Group

(57) ABSTRACT

A food or beverage container, or portion thereof, including a metal substrate and a coating on at least a portion of the metal substrate, the coating formed being from a coating composition comprising a polymer having one or more substituted or unsubstituted spirocyclic segments such as substituted or unsubstituted segments of 2,4,8,10-tetraoxaspiro [5.5] undecane.

19 Claims, No Drawings

(56) References Cited

U.S. PATENT DOCUMENTS

| | | | | |
|---|---|---|---|---|
| 2006/0057314 | A1 | 3/2006 | Ikeda et al. | |
| 2007/0065608 | A1 | 3/2007 | Niederst | |
| 2010/0068433 | A1 | 3/2010 | Gibanel et al. | |
| 2010/0160549 | A1 | 6/2010 | Crawford et al. | |
| 2013/0206756 | A1 | 8/2013 | Niederst et al. | |
| 2013/0316109 | A1 | 11/2013 | Niederst et al. | |
| 2014/0364547 | A1 * | 12/2014 | Iwasaki | C08G 63/672 524/127 |
| 2016/0115345 | A1 | 4/2016 | Kuo et al. | |
| 2016/0115347 | A1 | 4/2016 | Kuo et al. | |
| 2016/0297994 | A1 | 10/2016 | Kuo et al. | |
| 2017/0327272 | A1 | 11/2017 | Chasser et al. | |
| 2019/0048136 | A1 | 2/2019 | Hirokane et al. | |
| 2019/0085170 | A1 | 3/2019 | O'Brien et al. | |
| 2019/0345359 | A1 | 11/2019 | Andriot et al. | |
| 2020/0095459 | A1 | 3/2020 | Calhoun et al. | |
| 2020/0207516 | A1 * | 7/2020 | Seneker | C09D 167/02 |
| 2021/0163780 | A1 * | 6/2021 | Retsch, Jr. | C09D 151/08 |

FOREIGN PATENT DOCUMENTS

| | | | | | |
|---|---|---|---|---|---|
| CN | 106536649 | A | | 3/2017 | |
| CN | 108503757 | A | * | 9/2018 | C08F 283/01 |
| CN | 111875784 | A | | 11/2020 | |
| CN | 113667275 | A | | 11/2021 | |
| EP | 0394589 | A2 | | 10/1990 | |
| JP | 62230874 | A | * | 10/1987 | |
| JP | S62230874 | A | | 10/1987 | |
| JP | H07242854 | A | | 9/1995 | |
| JP | H09-272837 | A | | 10/1997 | |
| JP | 2000273361 | A | | 10/2000 | |
| JP | 2003192775 | A | | 7/2003 | |
| JP | 2005-179490 | A | | 7/2005 | |
| JP | 2006-111001 | A | | 4/2006 | |
| JP | 2007-105999 | A | | 4/2007 | |
| JP | 2015117325 | A | | 6/2015 | |
| JP | 2016-522283 | A | | 7/2016 | |
| JP | 2017-197722 | A | | 11/2017 | |
| JP | 2018-505821 | A | | 3/2018 | |
| WO | 2010080117 | A1 | | 7/2010 | |
| WO | WO 2011130671 | A2 | | 10/2011 | |
| WO | WO 2012/109278 | A2 | | 8/2012 | |
| WO | 2013119686 | A1 | | 8/2013 | |
| WO | WO 2014/185285 | A1 | | 11/2014 | |
| WO | 2015057932 | A1 | | 4/2015 | |
| WO | WO 2015/078976 | A1 | | 6/2015 | |
| WO | WO 2015/179064 | A1 | | 11/2015 | |
| WO | WO 2016/105502 | A1 | | 6/2016 | |
| WO | WO 2017/079437 | A1 | | 5/2017 | |
| WO | WO 2018125895 | A1 | | 5/2018 | |
| WO | WO 2019/060403 | A1 | | 3/2019 | |
| WO | WO-2019046737 | A1 | * | 3/2019 | C09D 167/00 |
| WO | WO-2020023735 | A1 | * | 1/2020 | C09D 151/08 |
| WO | WO 2022/246120 | A1 | | 11/2022 | |

OTHER PUBLICATIONS

PCT; App. No. PCT/IB2020/061296; Written Opinion and International Search Report mailed Feb. 16, 2021.

Chinese Office Action for CN Application No. 202080081765.6, issued by the Chinese Patent Office on Sep. 21, 2023; 26 pgs. including English translation.

Japanese Office Action for JP 2022-529948 issued by the Japanese Patent Office on Oct. 10, 2024; 6 pgs. including English translation.

Geueke, Birgit, "Dossier-Can Coating" *Food Packaging Forum*, Dec. 2016; 10 pgs.

Japanese Office Action for JP 2022-529948 issued by the Japanese Patent Office on Mar. 28, 2025: 9 pgs. including English translation.

Japanese Office Action for JP 2022-529948, issued by the Japanese Patent Office on Aug. 7, 2025; 14 pgs including English translation.

* cited by examiner

PACKAGING COATING SYSTEM

CROSS-REFERENCE TO RELATED APPLICATIONS

This application is a 35 U.S.C. § 371 United States national stage application of International Application No. PCT/IB2020/061296, filed Dec. 1, 2020, which claims priority from U.S. Application Ser. No. 62/941,013, filed Nov. 27, 2019, the disclosure of which are both incorporated herein by reference.

TECHNICAL FIELD

This invention relates to coatings for packaging materials or other substrates which encounter food, beverage, or other products for human consumption or intimate human contact.

BACKGROUND

Coatings may be applied to containers, such as the interior and exterior surfaces of metal food and beverage containers, holding tanks, vessels, rail cars, bulk storage containers, pipes, other storage and transport articles, or systems, to protect the underlying substrate. Contact between a substrate and the packaged product or the external environment can lead to corrosion of the substrate material. This is particularly true when the contents of the container are chemically aggressive in nature.

Various coatings compositions have been used as protective adherent coatings including for example Bisphenol A ("BPA") and bisphenol F ("BPF") epoxy-based coatings. BPA and BPF have been used to prepare polymers having a variety of properties and uses. Although the balance of scientific data suggests that the use of such compounds in coatings is safe, there is a desire by some to reduce or eliminate the use of certain BPA and BPF-based compounds in containers and coatings, and especially those involving contact with foods or beverages.

SUMMARY

In some embodiments, this disclosure describes coating compositions and coated articles that include a polymer having one or more substituted or unsubstituted spirocyclic segments such as one or more segments of 2,4,8,10-tetraoxaspiro[5.5]undecane (e.g., below Formula I) within a backbone of the polymer. The disclosed coating compositions and coatings may be applied to food or beverage containers or other articles to help protect the underlying substrate material from the external environment or from materials contained therein, as well as protecting the packaged or contained products from the underlying substrate. In preferred embodiments, the polymers include one or more ether or ester segments and exhibit properties that are particularly suited for use as a protective coating for the food-contact surface of a food or beverage container.

In some embodiments, the disclosure describes a food or beverage container, or portion thereof, including a metal substrate, a coating on at least a portion of the substrate, the coating formed from a coating composition including a polymer having one or more spirocyclic segments optionally, and preferably, containing heterocyclic aliphatic groups (see, e.g., Formula I' below).

In another embodiment, the disclosure describes a method of forming a food or beverage container, or portion thereof. The method may include applying a coating composition to a metal substrate for a food or beverage container, where the coating composition includes a polymer having one or more spirocyclic segments optionally, and preferably, containing heterocyclic aliphatic groups (see, e.g., Formula I' below). The method further includes curing the coating composition to form a coating on the substrate.

In another embodiment, the disclosure describes a food or beverage coating composition suitable for use in forming a food-contact coating of a metal food or beverage can, the coating composition including a polymer having one or more spirocyclic segments optionally, and preferably, containing heterocyclic aliphatic groups (see, e.g., Formula I' below).

In another embodiment, the disclosure describes a food or beverage coating composition including a polymer having one or more spirocyclic segments of the below Formula I':

Formula I'

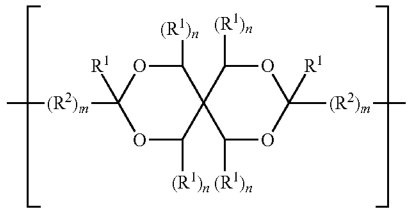

wherein each $R^1$ is independently an atom or an organic group, each $R^2$, if present, is independently a multivalent organic group, n is independently 1 or 2, where when n is 1 the respective $R^1$ group is attached via a double bond, m is independently 0 or 1, and optionally, two or more $R^1$ or $R^2$ groups can join to form a cyclic or polycyclic group.

In preferred embodiments, the coating composition does not include any structural units derived from BPA, bisphenol F ("BPF"), bisphenol S ("BPS"), or any diepoxides thereof (e.g., diglycidyl ethers thereof such as BADGE, which is the diglycidyl ether of BPA). In addition, the coating composition preferably does not include any structural units derived from a polyhydric phenol having estrogenic agonist activity greater than or equal to that of BPS.

DETAILED DESCRIPTION

As used herein, "a," "an," "the," "at least one," and "one or more" are used interchangeably. Thus, for example, a coating composition that comprises "a" copolymer means that the coating composition includes "one or more" copolymers.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). When such groups are divalent, they are typically referred to as "arylene" or "heteroarylene" groups (e.g., furylene, pyridylene, etc.)

The term "bisphenol" refers to a polyhydric polyphenol having two phenylene groups that each includes a six-carbon ring and a hydroxyl group attached to a carbon atom of the ring, wherein the rings of the two phenylene groups do not share any atoms in common.

The term "comprises" and variations thereof do not have a limiting meaning where these terms appear in the description and claims. Methods, substances, groups, moieties, ingredients, components and other items that are said to comprise various steps or elements may also consist essentially of or consist of such steps or elements.

The terms "estrogenic activity" and "estrogenic agonist activity" refer to the ability of a compound to mimic hormone-like activity through interaction with an endogenous estrogen receptor, typically an endogenous human estrogen receptor. Estrogenic activity of a compound may be assessed by conducting an MCF-7 assay as discussed further below.

The term "unsaturated double bond" refers to a non-aromatic carbon-to-carbon double bond capable of undergoing further reaction (e.g., free-radical polymerization, Diels-Alder reactions, Ene reactions, or oxidative cure reactions). Such double bonds may include, but are not limited to vinylic groups, allylic groups, (meth)acryl groups, other $\alpha,\beta$ unsaturated groups, alkenyl groups, and the like.

The terms "a first," "a second," "a third," and the like are used to distinguish between separate components and are not intended to imply a particular quantity or order unless described otherwise. By way of example, a "second layer" being on a "first layer" is used to indicate the system includes at least two different layers. Additional layers, such as a "third layer" may likewise be present in the system and may be positioned on, under, or in-between the first and second layers depending on how the layer configuration is described.

The terms "food-contact surface" or "interior surface" refer to the substrate surface of an article (typically an inner surface of a food or beverage container) that is in contact with, or intended for contact with, a food or beverage product during the storage or transport of the food or beverage. By way of example, an interior surface of a metal substrate of a food or beverage container, or a portion thereof, is a food-contact surface even if the interior metal surface is coated with a coating composition and does not directly contact the food or beverage.

The term "independently" when used in reference to a group, moiety or other element means that such that each instance of such element may be the same or different. For example, if element E appears in two instances and can be independently X or Y, then the first and second instances of element E can be, respectively, X and X, X and Y, Y and X, or Y and Y.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate. In comparison, the phrase "directly on," when used in the context of a coating applied directly on a surface or substrate, refers to the coating in direct contact with the surface or substrate without the presence of any intermediate layers or coatings there between.

The term "organic group" means a hydrocarbon group (with optional elements other than carbon and hydrogen, such as oxygen, nitrogen, sulfur, and silicon) that may be further classified as an aliphatic group, cyclic group (e.g., aromatic and cycloaliphatic groups), or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group (e.g., an n-propyl isopropyl group). The term "alkenyl group" means an unsaturated, linear or branched hydrocarbon group with one or more carbon-carbon double bonds (e.g., a vinyl group). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. Substitution on the organic groups of the disclosed polyphenols is contemplated. The terms "group" and "moiety" may be used to differentiate between chemical species that allow for substitution or that may be substituted and those that do not allow or may not be so substituted. The term "group" is intended to be a recitation of both the particular moiety, as well as a recitation of the broader class of substituted and unsubstituted structures that include the moiety. Thus, when the term "group" is used to describe a chemical substituent, the described chemical material includes the unsubstituted group and that group with 0, N, Si, or S atoms, for example, in the chain (as in an alkoxy group) as well as carbonyl groups or other conventional substituents. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, isopropyl, t-butyl, heptyl, dodecyl, octadecyl, amyl, 2-ethylhexyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, isopropyl, t-butyl, heptyl, dodecyl, octadecyl, amyl, 2-ethylhexyl, and the like.

The term "molecular weight" as used herein with respect a group or segment in any of described Formulas refers to the sum of the atomic weights of the one or more atoms making up the respective group or segment. It is a theoretical calculation and a test method is not required to determine the molecular weight value.

The term "polycarboxylic acid" refers to a compound having two or more carboxylic acid groups or functional equivalent groups that can participate in an esterification reaction. A polycarboxylic acid compound may be in the form of a diacid, anhydrides, esters (e.g., alkyl ester), or like equivalent form.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers, polyether-acrylic copolymers, etc.) and typically refers to a macromolecule that includes multiple repeating monomer units. The term "polyether" refers to a polymer that contains a plurality of ether linkages within the backbone of the polymer.

The term "polyhydric phenol" (which includes dihydric phenols) as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-bisphenol are considered to be polyhydric phenols. As used herein, polyhydric phenols typically have six carbon atoms in an aryl ring, although it is contemplated that aryl or heteroaryl groups having rings of other sizes may be used.

The term "polyol" refers to a compound having two or more hydroxyl groups. The term "diol" refers to a polyol in which the compound has two hydroxyl groups.

The term "polyphenol" refers to a polyhydric material having two or more phenylene groups that each include a six-carbon ring and a hydroxyl group attached to a carbon atom of the ring, wherein the rings of the phenylene groups do not share any atoms in common.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "spirocyclic" refers to a compound having two or more cyclic groups connected through a single shared atom (e.g., carbon) present in a ring of each of the two or more cyclic groups. Thus, by way of example, neither 4,4'-biphenol or 2,6-naphthalene dicarboxylic acid include a spirocyclic segment. An example of a spirocyclic segment includes 2,4,8,10-tetraoxaspiro[5.5]undecane.

The term "substantially free" when used with respect to a coating composition that may contain a particular compound means that the coating composition contains less than 1,000 parts per million (ppm) of the recited compound (corresponding to less than 0.1 wt. %) regardless of the context of the compound (e.g., whether the compound is mobile in the coating or bound to a constituent of the coating). The term "essentially free" when used with respect to a coating composition that may contain a particular compound means that the coating composition contains less than 100 parts per million (ppm) of the recited compound regardless of the context of the compound. The term "essentially completely free" when used with respect to a coating composition that may contain a particular compound means that the coating composition contains less than 5 parts per million (ppm) of the recited compound regardless of the context of the compound. The term "completely free" when used with respect to a coating composition that may contain a particular compound means that the coating composition contains less than 20 parts per billion (ppb) of the recited compound regardless of whether the context of the compound. When the phrases "free of" (outside the context of the aforementioned phrases), "do not contain", "does not contain", "does not include any" and the like are used herein, such phrases are not intended to preclude the presence of trace amounts of the pertinent structure or compound which may be present but were not intentionally used, e.g., due to the presence of environmental contaminants. As will be appreciated by persons having ordinary skill in the art, the amount of a compound in an ingredient, polymer, formulation or other component typically may be calculated based on the amounts of starting materials employed and yields obtained when making such ingredient, polymer, formulation or other component.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION

This disclosure describes coating compositions that include a polymer having one or more substituted or unsubstituted spirocyclic segments such as one or more segments of substituted or unsubstituted 2,4,8,10-tetraoxaspiro[5.5]undecane (e.g., segments of the below Formula I) within a backbone of the polymer. Such coating compositions may be useful for coating a variety of substrate materials including, for example, food or beverage containers or other general packaging containers. This disclosure also describes methods for forming such polymers and methods of producing coatings formed from such coating compositions.

In preferred embodiments, the disclosed polymers and coating compositions do not include any structural units or materials derived from BPA, BPF, BPS, and the like, or any diepoxides thereof (e.g., diglycidyl ethers or "DGEs"). More preferably, the disclosed polymers and coating compositions do not include any structural units derived from polyhydric phenols having estrogenic agonist activity greater than or equal to that of BPS. A discussion of non-estrogenic polyhydric phenols is provided in U.S. Pat. No. 10,435,199, which is incorporated by reference in its entirety. The disclosed spirocyclic segments may be used as an alternative for bisphenol-type reactants or derivatives thereof (e.g., diepoxides of bisphenols). As such, in some embodiments the disclosed polymers may be substantially free of bisphenols.

The disclosed polymers are suitable for use in a variety of end uses including, for example, as a film-forming material of a coating for packaging articles. As discussed further below, in preferred examples, the disclosed coating compositions may be applied to metal substrates of packaging articles such as food or beverage containers (e.g., food cans, beverage cans, and the like) to help protect the underlying metal substrate from the external environment or materials contained therein. In such embodiments, the substrate may include metals such as steel (e.g., cold-rolled steel, plated steel, or electro tinplated steel) or aluminum with aluminum being a preferred metal substrate. The coating compositions may be applied on interior or exterior surfaces of such containers.

The balance of coating performance attributes required for a coating composition to be suitable for use as a food or beverage container coating are particularly stringent and unique from other coating end uses. Such performance characteristics may include, but not are limited to, the need for adequate coating coverage at minimal coating weights and thicknesses, adhesion to the substrate, chemical resistance (particularly for aggressive foods or beverages), adequate flexibility (e.g., to survive post-coating fabrication steps and routine drop can events), sufficient long-term storage life of the coating composition coupled with the ability to obtain fast cure times, compatibility with conventional coating machinery, FDA compliance, no imparting of off-flavors or odors for the packaged product, and the like. Due to these stringent requirements, coatings designed for other end uses are not typically suitable for use as a food or beverage container coating. However, because the disclosed coating compositions are suitable for such food or beverage container coatings, they may also be suitable for a variety of end uses other than food or beverage container coatings, which are generally less demanding. Other example end uses for the disclosed coating compositions may include, but are not limited to, holding tanks, vessels, rail cars, metal coils, bulk storage containers, pipes, valves, and other storage articles or systems. Other exemplary substrate materials that may benefit from the application of the disclosed coating compositions may include other metals, concrete, fiberboard, plastic (e.g., polyesters such as, e.g., polyethylene terephthalates, nylons, polyolefins such as, e.g., polypropylene, polyethylene, and the like, ethylene vinyl alcohol, polyvinylidene chloride, and copolymers thereof), glass-reinforced plastics, and the like.

The disclosed coating compositions include a polymer having one or more spirocyclic segments within the backbone of the polymer. The two or more rings present in the spirocyclic segment may be of any suitable ring size, or combination of ring sizes, such as, e.g., rings having 4, 5, 6, 7, or 8 or more atoms in the ring itself, with 5 or 6 being presently preferred. Preferably, the spirocyclic segments contain heterocyclic groups, more preferably heterocyclic aliphatic groups. Suitable heteroatoms may include, for example, nitrogen, oxygen, silicon, and sulfur. More preferably, each cyclic group of the spirocyclic includes a five or six member ring containing oxygen and carbon atoms. In preferred embodiments, the spirocyclic segments (excluding attached substituent or linking groups) include seven carbon atoms and four oxygen atoms (e.g., substituted 2,4,8,10-tetraoxaspiro[5.5]undecane).

In some embodiments, the disclosed polymer may include one or more spirocyclic segments of the below Formula I:

Formula I

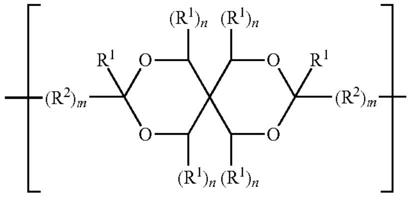

where:

each $R^1$ is independently an atom or an organic group;

each $R^2$, if present, is independently a multivalent organic group;

the subscript n is independently 1 or 2, where when n is 1 the respective $R^1$ group is attached via a double bond;

the subscript m is independently 0 or 1; and optionally, two or more $R^1$ or $R^2$ groups can join to form a cyclic or polycyclic group.

Each $R^1$ may independently be an atom such as a hydrogen or a halogen atom, with hydrogen being preferred. Additionally, or alternatively, one or more $R^1$ may include an organic group such as a hydrocarbon group that may include one or more heteroatoms. Example organic groups include hydrocarbon groups containing one to ten carbon atoms in linear, branched, or cyclic arrangements. In some embodiments, each $R^1$ may be a hydrogen atom.

Each $R^2$ group, if present, is independently a multivalent organic group including divalent or trivalent groups. In some embodiments, $R^2$ is a hydrocarbon group, which may optionally include one or more heteroatoms. In preferred examples, each $R^2$ group includes one or more oxygen atoms, more preferably one or more ether or ester segments, or a combination thereof. Additionally, or alternatively, $R^2$ may include one or more aryl or heteroaryl groups such as one or more phenylene groups. Suitable heteroaryl groups may include, for example, furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on.

In some embodiments, $R^2$ may include one or more step growth groups. Such step growth groups may facilitate additional crosslinking or addition of the polymer during the curing process. Example step growth groups may include, but are not limited to, amine groups, carboxyl groups, epoxide groups, hydroxyl groups, and the like.

While the upper limit for the molecular weight of each $R^2$ group is not specifically limited and will depend on the desired properties of the coating composition or coating as well as the ingredients used to form the polymer, in some embodiments each $R^2$ group may have a molecular weight of less than about 250 Daltons (Da), less than about 150 Da, and more preferably less than about 100 Da. In some embodiments, each embodiments each $R^2$ group has a molecular weight of about 72 Da (e.g., C4H80).

The disclosed polymer may include one or more ether, ester, amide, imide, carbamate, urea, carbonate ester, or other linkage segments within the backbone of the polymer. In preferred examples, the polymer is a polyether polymer, polyester polymer, or a copolymer thereof. Additionally, the polymer may include a plurality of aromatic segments (e.g., phenylene groups) that can help improve or optimize one or more desired performance characteristics (such as adhesion to a substrate, or chemical resistance) of a coating composition containing the polymer.

Coatings produced by the disclosed coating compositions may exhibit several beneficial properties including, but not limited to, a glass transition temperature ("Tg"), good adhesion with a metal substrate, food safe, rapid cure times at elevated temperatures, and shelf-life stability as a liquid coating composition, which may be particularly suited for coating systems for packaging articles, in particular in food or beverage containers. The glass transition temperature may be adjusted depending on the ingredients reacted (e.g., those other than ingredients containing segments of Formula I) to produce the disclosed polymers or the type of polymer (e.g., polyether or polyester). The disclosed polymers (polymers prior to cure and crosslinking) will typically have a Tg of at least about 30° C., at least about 40° C., at least about 50° C., at least about 60° C., at least about 70° C., at least about 80° C., or at least about 90° C. The Tg may, for example, also be less than about 130° C., less than about 120° C., less than about 110° C., less than about 100° C., less than about 95° C., or less than about 90° C. Higher levels of aryl or heteroaryl groups within the polymer can increase the resultant Tg as compared to similar polymers with higher levels of linear aliphatic groups. Certain non-aromatic cyclic groups can also be used to increase Tg such as, for example, cyclobutane groups (e.g., as present in 2,2,4,4-Tetramethyl-1,3-cyclobutanediol), polycyclic groups (e.g., norbornane, norbornene (e.g., as present in nadic anhydride), tricyclodecanedimethanol (e.g., as in tricyclodecanedimethanol), isosorbide, and the like), and combinations thereof. Similarly, the absence, or relative absence, of long-chain hydrocarbon groups or segments can also help achieve a higher Tg.

The Tg of the polymer may also be adjusted depending on whether the coating is applied to an interior or exterior surface. For example, in some embodiments where the coating composition is applied to an interior surface of a food or beverage container it may be desirable to have a polymer Tg of at least about 30° C., and more preferably greater than 60° C. In examples where polymer is a polyether polymer, it may be desirable to have a Tg of greater than about 70° C. In examples where polymer is a polyester polymer, it may be desirable to have a Tg of greater than about 30° C. In examples where the coating is applied to an exterior surface of a food or beverage container the Tg of the polymer may be within or outside the ranges discussed above. The DSC test method in the Examples Section is a useful test for determining Tg.

In some embodiments in which the polymer is a polyester polymer, the polymer may have a Tg that is greater than 0° C., greater than 30° C., or greater than 40° C. to less than 95° C., less than 80° C., less than 70° C., or even less than 50° C.

Having a suitable Tg value may be especially important in applications where the coating composition will be in contact with food or beverage products during retort processing at high temperature (e.g., at temperatures at or above about 100° C. and sometimes accompanied by pressures in excess of atmospheric pressure), particularly when retorting products that are more chemically aggressive in nature such as acidic foods or beverages. The inclusion of segments of Formula I alone, or inclusion of segments of Formula I and one or more aryl or heteroaryl groups in the polymer may help obtain a desired Tg within the described range. Additionally, without being bound by theory, the oxygen atoms within the 2,4,8,10-tetraoxaspiro[5.5]undecane structure are believed to provide the polymer with high Tg resilience over a longer lifespan. In some embodiments, conventional polymers used in food or beverage coatings can undergo autooxidation leading to reduction in the performance properties of the coating. One such reduction is a diminished Tg. The oxygen atoms within the 2,4,8,10-tetraoxaspiro[5.5]undecane structure may to undergo auto-oxidation during the lifespan of the container however, the resultant reactions with the oxygen atoms are believed to form cyclic ether linkages that help preserve the higher Tg values and do not result in a significant Tg decrease in the coating.

In some embodiments, the polymer in the disclosed coating composition may be a polyether polymer. The disclosed polyether polymers may be formed using reactants that include (a) one or more polyepoxides, more preferably one or more diepoxides, and (b) an extender that includes two or more reactive groups capable of reacting with oxirane (e.g., epoxy groups). For example, the extender may include two or more acid groups, hydroxyl groups, amine groups, or combinations thereof (e.g., one or more acid and one or more hydroxyl, one or more acid and one or more amine, or one or more hydroxyl and one or more amine). Additionally or alternatively, the disclosed polymers may copolymer with other monomers or polymers or may be blended with one or more other materials such as aliphatic DGE.

In preferred embodiments, the extender includes one or more polyols, more preferably one or more polyhydric phenols, and even more preferably one or more dihydric phenols. In such embodiments, one or both of the polyepoxide or extender includes one or more segments of the below Formula II:

Formula II

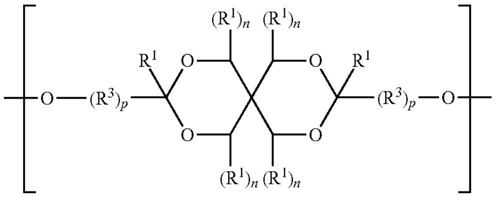

where:

each O is an ether oxygen;

each $R^1$ and the subscript n is the same as in Formula I;

each $R^3$, if present, is independently a multivalent organic group (e.g., linear or branched), and preferably is a hydrocarbon;

the subscript p is independently 0 or 1, and preferably 1; and optionally, two or more $R^1$ or $R^3$ groups can join to form a cyclic or polycyclic group.

$R^3$ is an organic group, preferably an organic group including one to ten carbon atoms and may contain one or more heteroatoms, more preferably, each $R^3$ group includes one to four carbon atoms. In some embodiments, $R^3$ in combination with the adjacent oxygen atom may be the same as $R^2$ of Formula I. Thus, in some embodiments, $R^3$ and the adjacent oxygen atom collectively may have a molecular weight of less than about 250 Daltons (Da), less than about 150 Da, and more preferably less than about 100 Da. In some embodiments, $R^3$ may be $—CH_2—C(CH_3)_2—$ having a molecular weight of about 56 Da.

In preferred embodiments the spirocyclic segments, including, e.g., those of Formulas I and II, are free of halogen atoms (e.g., bromine, chlorine, fluorine, and the like). More preferably, the overall polymer is free of halogen atoms.

In preferred embodiments, the polyepoxide, such as a diepoxide, includes one or more segments of Formula II, which is then reacted with an extender. The diepoxide may be initially prepared by reacting a diol (e.g., the diols of Formula III discussed further below) with a halohydrin (for example, epichlorohydrin) to form a diepoxide analog (viz., a DGE) with oxirane terminal groups.

Suitable diols that may be used to produce diepoxides containing one or more segments of Formula II include diols of the below Formula III:

Formula III

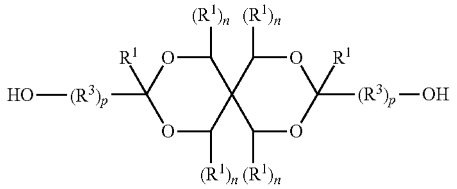

where:

each $R^1$ and the subscript n is the same as in Formula I; and each $R^3$ and the subscript p is the same as in Formula II.

Example diols that satisfy Formula III include, but are not limited to, 3,9-bis(1,1-dimethyl-2-hydroxyethyl)-2,4,8,10-tetraoxaspiro[5.5]undecane; 2,4,8,10-tetraoxaspiro[5.5]undecane-3,9-diylbis(2-methylpropane-2,1-diyl) bis[3-[3-(tert-butyl)-4-hydroxy-5-methylphenyl]propanoate]; and the like. In preferred examples, the diol includes 3,9-bis(1,1-dimethyl-2-hydroxyethyl)-2,4,8,10-tetraoxaspiro[5.5]undecane, which has the following structure:

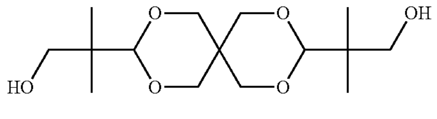

or substituted forms thereof. In some embodiments, the diols of Formula III may have a molecular weight of less than about 1,000, less than about 500, or less than about 350 Da.

Diols of Formula III may be reacted with epichlorohydrin or other suitable material to produce a diepoxide. Conditions for the preparation of the diepoxide may be carried out using standard techniques that will be known to persons having ordinary skill in the art. For example, diols containing one or more segments of Formula III may be reacted with epichlorohydrin in an alkaline medium. The desired alkalinity may be obtained by adding basic substances, such as sodium or potassium hydroxide, preferably in stoichiometric excess to the epichlorohydrin. The reaction is preferably carried out at temperatures of 50° C. to 150° C. Heating is preferably continued for several hours to effect the reaction and the product is then washed free of salt and base. Procedures for similar reactions are disclosed, for example, in U.S. Pat. No. 2,633,458.

Example diepoxide compounds containing segments of Formula II include, but are not limited to diepoxides of (e.g., diglycidyl ethers or diglycidyl esters of): 3,9-bis[4-(oxiran-2-ylmethoxy)phenyl]-2,4,8,10-tetraoxaspiro[5.5]undecane; 3,9-bis[2-methyl-1-(oxiran-2-ylmethoxy)propan-2-yl]-2,4,8,10-tetraoxaspiro[5.5]undecane; 3,9-bis(oxiran-2-yl)-2,4,8,10-tetraoxaspiro[5.5]undecane; and the like.

The resulting epoxide compounds containing one or more segments of Formula II may then be reacted with any suitable extender bearing two identical or different oxirane-reactive groups (for example hydroxyl groups, hydroxyphenyl groups, acid groups or amine groups) or with combinations of extenders to build the molecular weight of the resultant polyether polymer.

Preferred extenders include polyols containing two or more hydroxyl groups, in particular one or more hydroxyphenyl groups (for example, dihydric phenols) that react with the above-mentioned diepoxides to provide upgraded molecular weight polyether polymers that include segments of Formula I or II. In some embodiments the resulting linkage between the disclosed diepoxides and polyols produce one or both of $—CH_2—CH(OH)—CH_2—$ or $—CH_2—CH_2—CH(OH)—$ segments within the backbone of the resultant polyether polymer.

In some embodiments, the extenders may include hindered diphenols such as ortho-substituted diphenols such as 4,4'-methylenebis(2,6-dimethylphenol) as described in U.S. Pat. No. 9,409,219 B2 (Niederst et al. '219); unsubstituted diphenols having low estrogenicity (for example, 4,4'-(1,4-phenylenebis(propane-2,2-diyl))diphenol and 2,2'methylenebis(phenol)) as also described in Niederst et al. '219; diphenols such as those described (for example, the bis-4-hydroxybenzoate of cyclohexanedimethanol) in U.S. Pat. No. 8,129,495 B2 (Evans et al. '495); or di(amido(alkyl) phenol) compounds as described in International Application No. WO 2015/057932 A1 (Gibanel et al.).

In other embodiments, the polyol may include one or more aryl or heteroaryl groups such as phenylene groups. Preferred examples of such polyols include dihydric compounds of the below Formula IV:

Formula IV

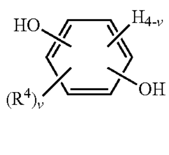

Where H is hydrogen, each $R^4$ is independently an atom other than hydrogen or an organic group that preferably has a molecular weight of at least 15 Daltons, and the subscript v is 0 to 4. The $R^4$ atoms or groups are preferably substantially non-reactive with an epoxy group. In some embodiments, at least one $R^4$ may be a hydrocarbon group positioned at an ortho or meta position relative to at least one of the ring attached hydroxyl groups. Additionally, or alternatively, two or more $R^4$ groups can optionally join to form one or more cyclic groups.

Exemplary dihydric compounds of Formula IV that may be reacted with diepoxides containing one or more segments of Formula II include, for example, catechol and substituted catechols (e.g., 3-methylcatechol, 4-methylcatechol, 4-tert-butyl catechol, and the like), hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquinone, 2,5-di-tert-butylhydroquinone, methoxyhydroquinone and the like), resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like), and variants and mixtures thereof.

Depending on stoichiometry and type of extender used, the resultant polyether polymer may have a variety of molecular weights, such as a number average molecular weight (Mn) of at least about 2,000, more preferably at least about 3,000, and even more preferably at least about 4,000. The upper limit for the molecular weight of the resultant polyether polymer will in general be governed by considerations such as the polymer solubility limit in the chosen coating liquid carrier, and may for example be an Mn value of less than about 20,000, less than about 10,000, less than about 8,000 or less than about 6,000. In some embodiments, the resultant polymers will have Mn values that are the same as or similar to the Mn values of commercially available BPA-based epoxy materials (e.g., those available under trade designations such as EPON 828, 1001, 1007 and 1009 from Resolution Performance Products, Houston, Texas), as doing so may simplify product reformulation and removal of BPA materials. The number-average molecular weight can be determined by a number of methods, such as, for example, gel permeation chromatography (GPC) using a polystyrene standard for calibration. The disclosed polymers may exhibit any suitable polydispersity index (PDI). In embodiments in which the polymer is a polyether polymer intended for use as a binder polymer of a liquid applied packaging coating (e.g., a food or beverage can coating), the polyether polymer will typically exhibit a PDI of from about 1.5 to 5, more typically from about 2 to 3.5, and in some instances from about 2.2 to 3 or about 2.4 to 2.8.

The resultant polyether polymers preferably include more than 1 percent by weight (wt. %), more than 5 wt. %, or more than 10 wt. % of segments of Formula II based on the relative weight of reactants containing segments of Formula II versus the total weight of solid reactants use to make the polymer. In some embodiments, the polymers include less than 70 wt. %, lest than 40 wt. %, less than 30 wt. %, or less than 25 wt. %, segments of Formula II.

The disclosed polymers may be reacted with a variety of other materials to form desirable products. For example, epoxy-terminated polymers may be reacted with fatty acids to form polymers having unsaturated (e.g., air oxidizable) reactive groups, or with acrylic acid or methacrylic acid to form free radically curable polymers. Such epoxy-terminated polymers may also be reacted with a suitable diacid (such as adipic acid) to further advance the polymer molecular weight.

In some embodiments, the polyether polymers containing one or more segments of Formula I or II may include both ester and ether segments in the backbone of the polymer. In other embodiments, the disclosed polyether polymers do not include any ester linkages in a backbone of the polymer (e.g., $R^2$ excludes ester segments).

In other embodiments, the disclosed coating composition includes a polyester polymer having one or more segments of Formula I and a liquid carrier (e.g., water and/or an organic solvent). A variety of compounds having one or more segments of Formula I and reactive functional groups capable of participating in ester-forming reactions (e.g., hydroxyl groups, carboxylic groups, etc.) can be used to make the disclosed polyester polymers. Suitable reaction schemes may include direct esterification reactions or transesterification reactions. For example, polyester polymers may be prepared by reacting one or more dicarboxylic acids and one or more diols via direct esterification, by reacting together one or more dimethyl esters and one or more diols (e.g., diols of Formula III) via transesterification, or by carrying out both direct esterification and transesterification in a multistep process. While not intending to be bound by theory, is some embodiments, it is believed that some degradation of 3,9-bis(1,1-dimethyl-2-hydroxyethyl)-2,4,8,10-tetraoxaspiro[5.5], or bicyclic structural units derived therefrom, started to occurred at polymerization temperatures as low as about 210 to 220° C. Thus, in some embodiments, it may be advantageous to keep the temperature during polymerization below about 220° C., more preferably below about 210° C. The resultant polyester polymer contains ester functional groups in the main chain (e.g., backbone), and is preferably derived from ingredients including a combination of a diacid or diester, and a diol, wherein either the diacid, diester, diol, or combinations thereof include one or more segments of Formula I.

In some embodiments, the polyester may be formed from ingredients that include a diol of the above Formula III. Diols of Formula III may be reacted with a suitable polycarboxylic acid to produce a polyester polymer. Exemplary polycarboxylic acids include, but are not limited to, maleic acid, fumaric acid, itaconic acid, succinic acid, adipic acid, sebacic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, isophthalic acid, terephthalic acid, trimellitic acid, naphthalene dicarboxylic acid, cyclohexane dicarboxylic acid, glutaric acid, a dimer fatty acid (e.g., Radiacid 960 dimer fatty acid), nadic acid, furandicarboxylic acid, anhydrides or esterified derivatives thereof, or combinations thereof. If desired, adducts of polyacid compounds (e.g., triacids, tetraacids, etc.) and monofunctional compounds may be used. It should be understood that in synthesizing the polyester polymer, the specified polycarboxylic acids compounds may be in the form of anhydrides, esters (e.g., alkyl ester), or like equivalent form. Thus, polycarboxylic acids are considered to include anhydride or ester compounds.

Additionally, or alternatively, the disclosed polyester polymer may be formed using ingredients that include one or more diacids containing one or more segments of Formula I. Such diacid compounds may include, but are not limited to 2,4,8,10-tetraoxaspiro[5.5]undecane-3,9-dicarboxylic acid, 3,9-dimethyl-2,4,8,10-tetraoxaspiro[5.5]undecane-3,9-dicarboxylic acid, or variations thereof. Such diacids may be reacted with one or more diols of the above Formula III, one or more polyols that do not include structures of Formula III, or combinations thereof, with diols of Formula III being preferred. Examples of suitable polyols that may be used to form the polyester polymers include, but are not limited to, all the polyols discussed above with respect to the formation of the polyether polymer. Other suitable polyols that may be used to form the polyester polymer may include, but are not limited to, diols, polyols having three or more hydroxyl groups (e.g., triols, tetraols, etc.), and combinations thereof including, for example, ethylene glycol, propylene glycol, 1,3-propanediol, 2-methyl-1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, 1,6-hexanediol, hexylene glycol, cyclohexanedimethanol, tricyclodecane dimethanol, a polyethylene or polypropylene glycol, isopropylidene bis (p-phenylene-oxypropanol-2), 2,2,4,4-tetramethyl-1,3-cyclobutanediol, and mixtures thereof. If desired, adducts of polyol compounds (e.g., triols, tetraols, etc.) and monofunctional compounds may be used. In some embodiments, the polymer is not made using neopentyl glycol. Additional suitable dihydric compounds are disclosed in U.S. Patent Application Publication No. US 2013/0206756 A1 (Niederst et al. '756) and in International Application No. WO 2013/119686 A1 (Niederst et al. '686).

In some embodiments, one or more of the polyols or polycarboxylic acids used in the formation of the polyester polymer may contain one or more aryl or heteroaryl groups, with phenylene groups being preferred. As discussed above, the inclusion of such aryl or heteroaryl groups may help improve one or more of the properties of the resultant polymer and coating including, for example, improve the resultant Tg.

As will be apparent to those in the art, the directionality of the ester segments within the polyester relative to the Formula I segment will depend on whether the dicarboxylic acid or the polyol ingredient used includes the Formula I segment. For example, where a diol of Formula III is reacted with a polycarboxylic acid, the resultant polymer will include segments of —(CO)—O—X—O—(CO)— where X represents the Formula I segment provided by the diol. In contrast, where a polycarboxylic acid that includes a segment of Formula I is reacted with a polyol (e.g., polyol of Formula IV) the resultant polymer will include segments of —O—(CO)—Y—(CO)—O— where Y represents the Formula I segment provided by the polycarboxylic acid. In embodiments where both the polyol and the polycarboxylic acid include segments of Formula I, the resultant polymer will include segments of —O—(CO)—Y—(CO)—O—X—O—(CO)— where X and Y represent the Formula I segments provided by the polyol and polycarboxylic acid respectively.

The disclosed polyesters may also include one or more modifications, such as co-polyesters, grafted polyesters (e.g., polyester-acrylic graft copolymers), water-dispersible polyesters, etc. A copolyester may result from the introduction of other diacids or diols (e.g., ingredients that do not include segments of Formula I). Thus, the copolyester may be formed from two or more different diacids or two or more different diols. A water-dispersible polyester may include an acrylated polyester polymer, formed for example, as a result of grafting acid-functional acrylic groups to a polyester to render the polyester water-dispersible. The grafting can occur via a variety of means (e.g., reacting complimentary end-groups, polymerizing acrylic monomers onto unsaturation in the polyester, hydrogen abstraction, etc.). In some embodiments, unsaturation may be included in the polyester polymer to enable incorporation, via the double bonds, of water-dispersing groups using, e.g., a Diels-Alder and/or Ene reaction scheme as taught in U.S. Pat. No. 9,650,176.

In some embodiments, the disclosed polymers do not include any acrylate portions. That is, in some embodiments, the polymer is a polyester polymer or a polyether polymer that is neither a polyester-acrylic copolymer nor a polyether-acrylic copolymer. Moreover, in some embodiments, the overall coating composition includes little, if any, acrylic content (e.g., less than 5 wt-%, less than 1 wt-%, or less than 0.1 wt-%, if any, based on total solids in the coating composition).

The disclosed polyester polymers may be of any suitable molecular weight. In preferred embodiments, the polyester polymers will have a number average molecular weight (Mn) of at least 1,000 Daltons (Da). While the upper molecular weight range is not restricted, such polyester polymers preferably have a Mn of less than 50,000 Da. The molecular weight may vary depending on a variety of factors, including, for example, the desired coating end use, cost, and the manufacturing method employed to synthesize the polymer. In certain embodiments, a disclosed polyester polymer has a number average molecular weight of at least at least 2,000 Da, or at least 3,000 Da. In certain embodiments, the disclosed polyester polymers have a number average molecular weight of up to 20,000 Da or up to 15,000 Da, and particularly for water-based systems, up to 10,000 Da, or particularly for solvent-based systems, up to 7,000 Da. In some embodiments, the disclosed polyester polymers have a Mn of less than about 6,100 Da, such as for example about 2,500 to about 5,500 Da. The Mn may be measured using gel permeation chromatography and a polystyrene standard.

In some embodiments, the disclosed polyester polymers may include more than 3 wt. % of segments of Formula I based on the relative weight of reactants containing segments of Formula I (e.g., diol of Formula III or the diacid) versus the total weight of solid reactants use to make the polymer. More preferably, the polyester polymers include at least 5 wt. %, at least 10 wt. %, at least 15 wt. %, or at least 20 wt. %, segments of Formula I in the backbone of the polyester. In some embodiments, the polymers include less than 70 wt. %, lest than 40 wt. %, less than 30 wt. %, or less than 25 wt. %, segments of Formula I. In some embodiments, the polyester polymers include about 23 wt. % of segments of Formula I.

The disclosed polymers (e.g., disclosed polyester polymers, polyether polymers, or copolymers thereof) containing such segments of Formula I can be either thermoset or thermoplastic compositions. In preferred embodiments, the disclosed polymers will be included in the coating compositions as a thermoset composition (e.g., a polymer that becomes irreversibly hardened upon the coating composition being cured to form a coating) in conjunction with a liquid carrier.

The disclosed polymers (disclosed polyester polymers, polyether polymers, or copolymers thereof), as present for example in the fully formulated coating composition, can be saturated or unsaturated. Iodine value is a useful measure of the number of aliphatic carbon-carbon double bonds, or the level of unsaturation, if any, present the disclosed polymers. Unsaturation may be particularly advantageous when present in the disclosed polyester polymers to, for example, facilitate oxidative cure, and especially when in the presence of a suitable metal drier and/or ether-containing component. In some embodiments, one or more ether linkages are present in the disclosed polyester polymers. Such crosslinking mechanisms may allow for the preparation of a coating composition having a suitable degree of cross-linking upon thermal bake of the coating composition, without the inclusion of any formaldehyde-containing ingredients (e.g., phenol-formaldehyde crosslinkers and/or amino-formaldehyde crosslinkers). The disclosed polymers may have any suitable iodine value to achieve a desired result such as, for example, at least about 10, at least about 20, at least about 30, at least about 40, or at least about 50. An upper range of suitable iodine values is not particularly limited, but in most embodiments the iodine value, if any, typically will not exceed about 120 or about 100. The iodine values herein are expressed in terms of the centigrams of iodine per gram of the material. Iodine values may be determined as described below in the examples, for example, using ASTM D 5768-02 (Reapproved 2006) entitled “Standard Test Method for Determination of Iodine Values of Tall Oil Fatty Acids”. In certain embodiments, the total unsaturated polymer content of the coating composition exhibits an average iodine value pursuant to the aforementioned values or other iodine values disclosed herein.

Examples of unsaturated reactants for incorporating unsaturation into the disclosed polymers, and particularly polyester polymers, include fumaric acid, maleic acid, maleic anhydride, itaconic acid, nadic acid, nadic anhydride, a polybutadiene diol, derivatives thereof (e.g., methyl nadic anhdride), or combinations thereof. Maleic anhydride is a preferred unsaturated reactant.

Coating compositions herein may optionally include one or more metal drier catalysts to, for example, enhance cure of the coating composition when it includes unsaturated polymer. As mentioned above, the metal drier may be included together with an ether group or used in the composition without the ether group. If included, the one or more metal driers are preferably included in an efficacious amount. While not intending to be bound by any theory, it is believed that the presence of an efficacious amount of one or more metal driers may enhance crosslinking upon coating cure (e.g., by enhancing and/or inducing the formation of crosslinks between aliphatic carbon-carbon double bonds of the unsaturated polyester). Non-limiting examples of suitable metal driers may include compounds with aluminum (Al), antimony (Sb), barium (Ba), bismuth (Bi), calcium (Ca), cerium (Ce), chromium (Cr), cobalt (Co), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), any other suitable rare earth metal or transition metal, as well as oxides, salts (e.g., acid salts such as octoates, naphthenates, stearates, neodecanoates, etc.) or complexes of any of these, and mixtures thereof.

In some approaches, the amount of metal drier used (if any) will depend, at least partially, upon the particular drier(s) chosen for a particular end use. In general, however, the amount of metal drier present in the coating composition, if any, may suitably be greater than about 10 parts per million (“ppm”) by weight, preferably greater than about 25 ppm by weight, and more preferably greater than about 100 ppm by weight, based on the total weight of metal in the metal drier relative to the total weight of the coating composition. The amount of metal drier may suitably be less than about 25,000 ppm by weight, in other approaches, less than about 15,000 ppm by weight, and in yet further approaches, less than about 10,000 ppm by weight, based on the total weight of metal in the metal drier relative to the total weight of the coating composition.

The disclosed polyester polymers may include one or more urethane linkages, typically in a backbone of the polymer. Such one or more urethane linkages are typically introduced using an isocyanate reactant such as, for example, a diisocyanate, a partially-blocked isocyanate timer, or a combination thereof. The isocyanate may be any suitable compound, including an isocyanate compound having 1 isocyanate group; a polyisocyanate compound having 2, 3, or 4 or more isocyanate groups; or a mixture thereof.

Suitable diisocyanates may include isophorone diisocyanate (i.e., 5-isocyanato-1-isocyanatomethyl-1,3,3-trimethylcyclohexane); 5 isocyanato-1-(2-isocyanatoeth-1-yl)-1,3,3-trimethylcyclohexane; 5-isocyanato-1-(3-isocyanatoprop-1-yl)-1,3,3-trimethylcyclohexane; 5-isocyanato-(4-isocyanatobut-1-yl)-1,3,3-trimethylcyclohexane; 1-isocyanato-2-(3-isocyanatoprop-1-yl)cyclohexane; 1-isocyanato-2-(3-isocyanatoeth-1 yl)cyclohexane; 1-isocyanato-2-(4-isocy-anatobut-1 yl)cyclohexane; 1,2-diisocyanatocyclobutane; 1,3-diisocyanatocyclobutane; 1,2 diisocyanatocyclopentane; 1,3-diisocyanatocyclopentane; 1,2-diisocyanatocyclohexane; 1,3-diisocyanatocyclohexane; 1,4-diisocyanatocyclohexane; dicyclohexylmethane 2,4'-diisocyanate; trimethylene diisocyanate; tetramethylene diisocyanate; pentamethylene diisocyanate; hexamethylene diisocyanate; ethylethylene diisocyanate; trimethylhexane diisocyanate; heptamethylene diisocyanate; 2-heptyl-3,4-bis (9-isocyanatononyl)-1-pentyl-cyclohexane; 1,2-, 1,4-, and 1,3-bis(isocyanatomethyl)cyclohexane; 1,2-, 1,4-, and 1,3 bis(2-isocyanatoeth yl)cyclohexane; 1,3-bis(3-isocyanatoprop-1-yl) cyclohexane; 1,2-, 1,4- or 1,3-bis(4-isocyanatobuty-1-yl)cyclohexane; liquid bis(4-isocyanatocyclohexyl)-methane; and derivatives or mixtures thereof.

In some embodiments, the isocyanate compounds are preferably non-aromatic. Non-aromatic isocyanates are particularly desirable for coating compositions intended for use on an interior surface of a food or beverage container. Isophorone diisocyanate (IPDI) and hexamethylene diisocyanate (HMDI) are preferred non-aromatic isocyanates.

In some embodiments, at least some, or alternatively all, of the one or more isocyanate compounds may be a partially blocked polyisocyanate. Certain embodiments may benefit from the inclusion of one or more blocked isocyanate groups (e.g., deblockable isocyanate groups) in the polyurethane polymer as a means for forming covalent linkages with other components of the coating composition, including, for example, the polyurethane polymer itself. Preferred partially blocked polyisocyanates contain, on average: (i) at least about 1.5, more preferably at least about 1.8, and even more preferably at least about 2 free (or unblocked) isocyanate groups per molecule of partially blocked polyisocyanate and on average, and (ii) at least about 0.5, more preferably at least about 0.7, and even more preferably at least about 1 blocked isocyanate groups (preferably deblockable isocyanate groups) per molecule of partially blocked polyisocyanate. Presently preferred blocking agents for forming deblockable isocyanate groups include□□caprolactam, diisopropylamine (DIPA), methyl ethyl ketoxime (MEKO), and mixtures thereof. For further discussion of suitable materials and methodologies relating to the use of partially blocked isocyanate compounds in forming polyester-urethane polymers see U.S. Pat. No. 8,574,672.

Isocyanate content is a useful measure of the number of urethane linkages present in a polymer. In certain embodiments, the disclosed polyester polymers are formed from reactants including, based on total nonvolatiles, at least about 0.1 wt-%, more preferably at least about 1 wt-%, and even more preferably at least about 5 wt-% of an isocyanate compound. The upper amount of suitable isocyanate compound concentration is not particularly limited and will depend upon the molecular weight of the one or more isocyanate compounds utilized as reactants. Typically, however, the polymer is formed from reactants including, based on total nonvolatiles, less than about 35 wt-%, more preferably less than about 30 wt-%, and even more preferably less than about 25 wt-% of an isocyanate compound. Preferably, the isocyanate compound is incorporated into a backbone of the polymer via a urethane linkage, and more preferably a pair of urethane linkages.

In some embodiments, one or both ends of the backbone of the disclosed polyester polymers are hydroxyl terminated. Additionally, or alternatively, one or more hydroxyl groups located away from the terminal ends (e.g., as pendant groups) may be present on the disclosed polyester polymers. The polyester polymers may have any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D1957-86 (Reapproved 2001) entitled "Standard Test Method for Hydroxyl Value of Fatty Oils and Acids" and available from the American Society for Testing and Materials International of West Conshohocken, Pennsylvania. In certain preferred embodiments, the polyester polymer has a hydroxyl number of from 0 to about 150, even more preferably from about 5 to about 100, and optimally from about 10 to about 80 or about 20 to about 80.

The polyester polymer may have any suitable acid number. Acid numbers are typically expressed as milligrams of KOH required to titrate a 1-gram sample to a specified end point. Methods for determining acid numbers are well known in the art. See, for example, ASTM D974-04 entitled "Standard Test Method for Acid and Base Number by Color-Indicator Titration" and available from the American Society for Testing and Materials International of West Conshohocken, Pennsylvania. The range of suitable acid numbers may vary depending on a variety of considerations including, for example, whether water-dispersibility is desired. In some embodiments, the polyester polymer has an acid number of at least about 5, more preferably at least about 15, and even more preferably at least about 30. Depending on the desired monomer selection, in certain embodiments (e.g., where a solvent-based coating composition is desired), the polyester polymer has an acid number of less than about 40, less than about 10, or less than about 5.

The disclosed polymers may be applied to a variety of substrates as liquid-based coating compositions. Liquid coating compositions (typically including the polymer and a liquid carrier) may be preferred for many end uses, especially for use on heat-sensitive substrates or for substrates where an especially thin coating is desired. For liquid-based coating compositions, the disclosed polymer will typically constitute at least 10 wt. %, more typically at least 30 wt. %, and even more typically at least 50 wt. % of the coating composition, based on the total weight of resin solids in the coating composition. For such liquid-based coating compositions, the disclosed polymers will typically constitute less than about 90 wt. %, more typically less than about 85 wt. %, and even more typically less than about 75 wt. % of the coating composition, based on the total weight of resin solids in the coating composition. The liquid carrier may be water, organic solvent, or mixtures of various such liquid carriers. Accordingly, liquid thermoset coating compositions may be either water-based or solvent-based systems. Examples of suitable organic solvents include glycol ethers, alcohols, aromatic or aliphatic hydrocarbons, dibasic esters, ketones, esters, and the like, and combinations thereof. Preferably, such carriers are selected to provide a dispersion or solution of the polymer and any other materials of the coating composition. In some embodiments, the liquid carrier may be aqueous or substantially non-aqueous.

In some embodiments, the disclosed coating composition may be a latex emulsion containing the polymer. In some such embodiments, the polymer is water-dispersible and the coating composition may include latex polymer particles optionally formed in the presence of the polymer. For example, the disclosed polymer may be physically blended in a liquid emulsion as a polymeric surfactant to support emulsion polymerization of ethylenically unsaturated monomer component that produces that latex polymer particles. Examples of latex emulsions and techniques of forming such emulsions are described in, for example, US Patent Application Publication No. 2019/0085170 A1, which is incorporated by reference in its entirety. Physical blends of the water-dispersible polymer and latex polymer particles may also be employed, if desired.

Although thermoset coating compositions that include a liquid carrier are presently preferred, in other embodiments the disclosed coating compositions may have utility in solid coating application techniques such as, for example, powder coating, extrusion coating, laminate coating, and the like. In powder compositions, the compositions may include at least one polymer powder of the disclosed polymer that is heat or laser-sinterable. In some embodiments, such powder coating compositions may include the disclosed polymer optionally blended with other materials such as other polymers, optional reinforcing, or the like. Preferably, the polymer in such powdered composition has a melting temperature of less than 220° C. and more preferably less than about 175° C.

It is also expected that polymers of the present disclosure may be substituted for any conventional epoxy polymer present in a packaging coating composition known in the art. Thus, for example, the polyether polymer of the present disclosure may be substituted, for example, for a BPA/BADGE-containing polymer of an epoxy/acrylic latex coating system, for a BPA/BADGE-containing polymer of a solvent based epoxy coating system, etc. The amount of polymer of the present disclosure included in coating compositions may vary widely depending on a variety of considerations such as, for example, the method of application, the presence of other film-forming materials, whether the coating composition is a water-based or solvent-based system, etc. For liquid-based coating compositions, however, the polymer of the present invention may constitute at least 10 wt-%, more typically at least 30 wt-%, and even more typically at least 50 wt-% of the coating composition, based on the total weight of resin solids in the coating composition. For such liquid-based coating compositions, the polymer may constitute less than about 90 wt-%, more typically less than about 80 wt-%, and even more typically less than about 70 wt-% of the coating composition, based on the total weight of resin solids in the coating composition.

In some embodiments, the coating composition is an organic solvent-based composition preferably having at least 20 wt-% non-volatile components ("solids"), and more preferably at least 25 wt-% non-volatile components. Such organic solvent-based compositions preferably have no greater than 40 wt-% non-volatile components, and more preferably no greater than 25 wt-% non-volatile components. For this embodiment, the non-volatile film-forming components preferably include at least 50 wt-% of the polymer of the present invention, more preferably at least 55 wt-% of the polymer, and even more preferably at least 60 wt-% of the polymer. For this embodiment, the non-volatile film-forming components preferably include no greater than 95 wt-% of the polymer of the present invention, and more preferably no greater than 85 wt-% of the polymer.

In some embodiments, the coating composition of the present invention is a solvent-based system that includes no more than a de minimus amount of water (e.g., less than 2 wt-% of water), if any. One example of such a coating composition is a solvent-based coating composition that includes no more than a de minimus amount of water and includes: on a solids basis, from about 30 to 99 wt-%, more preferably from about 50 to 85 wt-% of polymer of the present invention; a suitable amount of crosslinker (e.g., a phenolic crosslinker or anhydride crosslinker); and optionally inorganic filler (e.g., $TiO_2$) or other optional additives. In one such solvent-based coating composition of the present invention, the polymer is a high molecular weight polyether polymer that preferably has an Mn of about 7,500 to about 10,500 Da, more preferably about 8,000 to 10,000 Da, and even more preferably about 8,500 to about 9,500 Da.

In one embodiment, the coating composition is a water-based composition preferably having at least 15 wt-% non-volatile components. In one embodiment, the coating composition is a water-based composition preferably having no greater than 50 wt-% non-volatile components, and more preferably no greater than 40 wt-% non-volatile components. For this embodiment, the non-volatile components preferably include at least 5 wt-% of the polymer of the present invention, more preferably at least 25 wt-% of the polymer, even more preferably at least 30 wt-% of the polymer, and optimally at least 40 wt-% of the polymer. For this embodiment, the non-volatile components preferably include no greater than 70 wt-% of the polymer of the present invention, and more preferably no greater than 60 wt-% of the polymer.

If a water-based system is desired, techniques may be used such as those described in U.S. Pat. Nos. 3,943,187; 4,076,676; 4,247,439; 4,285,847; 4,413,015; 4,446,258; 4,963,602; 5,296,525; 5,527,840; 5,830,952; 5,922,817; 7,037,584; and 7,189,787. Water-based coating systems of the present invention may optionally include one or more organic solvents, which will typically be selected to be miscible in water. The liquid carrier system of water-based coating compositions will typically include at least 50 wt-% of water, more typically at least 75 wt-% of water, and in some embodiments more than 90 wt-% or 95 wt-% of water. Any suitable means may be used to render the polymer of the present invention miscible in water. For example, the polymer may include a suitable amount of salt groups such as ionic or cationic salt groups to render the polymer miscible in water (or groups capable of forming such salt groups). Neutralized acid or base groups are preferred salt groups.

In certain embodiments, the preferred water dispersible polymers or copolymers have an acid number of at least 20 milligram (mg) KOH per gram dry resin, at least 30, at least 50, or at least 100. In other embodiments, the preferred solvent-based polymers may have an acid number of less than 20, less than 10, or less than 5. The acid number may be determined as described in the Examples Section.

In some embodiments, the polymer of the present invention is covalently attached to one or more materials (e.g., oligomers or polymers) having salt or salt-forming groups to render the polymer water-dispersible. The salt or salt-forming group containing material may be, for example, oligomers or polymers that are (i) formed in situ prior to, during, or after formation of the polymer of the present invention or (ii) provided as preformed materials that are reacted with a preformed, or nascent, polymer of the present invention. The covalent attachment may be achieved through any suitable means including, for example, via reactions involving non-aromatic carbon-carbon double bonds, hydrogen abstraction (e.g., via a reaction involving benzoyl peroxide mediated grafting via hydrogen abstraction such as, e.g., described in U.S. Pat. No. 4,212,781), or the reaction of complimentary reactive functional groups such as occurs, e.g., in condensation reactions. In one embodiment, a linking compound is utilized to covalently attach the polymer and the salt- or salt-forming-group-containing material. In certain preferred embodiments, the one or more materials having salt or salt-forming groups is an acrylic material, more preferably an acid- or anhydride-functional acrylic material.

In one embodiment, a water-dispersible polymer may be formed from preformed polymers (e.g., (a) an oxirane-functional polymer, such as, e.g., a polyether polymer, preferably having at least one segment of Formula I or II an acid-functional polymer such as, e.g., an acid-functional acrylic polymer) in the presence of an amine, more preferably a tertiary amine. If desired, an acid-functional polymer can be combined with an amine, more preferably a tertiary amine, to at least partially neutralize it prior to reaction with an oxirane-functional polymer.

In another embodiment, a water-dispersible polymer may be formed from an oxirane-functional polymer (more preferably a polyether polymer described herein) preferably having at least one segment of Formula I that is reacted with monomers containing unsaturated double bonds to form an acid-functional polymer, which may then be neutralized, for example, with a base such as a tertiary amine. Thus, for example, in one embodiment, a water-dispersible polymer preferably having at least one segment of Formula I may be formed pursuant to the acrylic polymerization teachings of U.S. Pat. Nos. 4,285,847 and/or 4,212,781, which describe techniques for grafting acid-functional acrylic groups (e.g., via use of benzoyl peroxide) onto epoxy-functional polymers. In another embodiment, acrylic polymerization may be achieved through reaction of monomers containing unsaturated double bonds with unsaturation present in the polymer preferably containing at least one segment of Formula I. See, for example, U.S. Pat. No. 4,517,322 and/or U.S. Published Application No. 2005/0196629 for examples of such techniques.

In another embodiment, a water-dispersible polymer may be formed having the structure E-L-A, wherein E is an epoxy portion of the polymer formed from a polyether polymer described herein, A is a polymerized acrylic portion of the polymer, and L is a linking portion of the polymer which covalently links E to A. Such a polymer can be prepared, for example, from (a) a polyether polymer described herein preferably having about two epoxy groups, (b) an unsaturated linking compound preferably having (i) a carbon-carbon double bond, a conjugated carbon-carbon double bonds or a carbon-carbon triple bond and (ii) a functional group capable of reacting with an epoxy group (e.g., a carboxylic group, a hydroxyl group, an amino group, an amido group, a mercapto group, etc.). Preferred linking compounds include 12 or less carbon atoms, with sorbic acid being an example of a preferred such linking compound. The acrylic portion preferably includes one or more salt groups or salt-forming groups (e.g., acid groups such as present in α,β-ethylenically saturated carboxylic acid monomers). Such polymers may be formed, for example, using a BPA- and BADGE-free polyether polymer of the present invention in combination with the materials and techniques disclosed in U.S. Pat. No. 5,830,952 or U.S. Published Application No. 2010/0068433.

In some embodiments, the coating composition of the present invention is substantially free of acrylic components. For example, in some embodiment the coating composition includes less than about 5 wt-% or less than about 1 wt-% of polymerized acrylic monomers (e.g., a mixture of ethylenically unsaturated monomers that include at least some monomer selected from acrylic acid, methacrylic acid, or esters thereof).

In another embodiment, a polymer preferably containing segments of Formula I and including $-CH_2-CH(OH)-CH_2-$ or $-CH^2-CH_2-CH(OH)-$ segments. This provides acid functionality which, when combined with an amine or other suitable base to at least partially neutralize the acid functionality, is water dispersible.

In some embodiments, the coating composition of the present invention is a low VOC coating compositions that preferably includes no greater than 0.4 kilograms ("kg") of volatile organic compounds ("VOCs") per liter of solids, more preferably no greater than 0.3 kg VOC per liter of solids, even more preferably no greater than 0.2 kg VOC per liter of solids, and optimally no greater than 0.1 kg VOC per liter of solids.

Reactive diluents may optionally be used to yield such low VOC coating compositions. The reactive diluent preferably functions as a solvent or otherwise lowers the viscosity of the blend of reactants. The use of one or more reactive diluents as a "solvent" eliminates or reduces the need to incorporate a substantial amount of other cosolvents (such as butanol) during processing. Reactive diluents suitable for use in the present invention preferably include free-radical reactive monomers and oligomers. A small amount of reactive diluent that can undergo reaction with the polymer of the present invention may be used (e.g., hydroxy monomers such as 2-hydroxy ethylmethacrylate, amide monomers such as acrylamide, and N-methylol monomers such as N-methylol acrylamide). Suitable reactive diluents include, for example, vinyl compounds, acrylate compounds, methacrylate compounds, acrylamides, acrylonitriles, and the like and combinations thereof. Suitable vinyl compounds include, for example, vinyl toluene, vinyl acetate, vinyl chloride, vinylidene chloride, styrene, substituted styrenes, and the like and combinations thereof. Suitable acrylate compounds include butyl acrylate, ethyl acrylate, 2-ethylhexyl acrylate, isobutyl acrylate, tert-butyl acrylate, methyl acrylate, 2-hydroxyethyl acrylate, poly(ethylene glycol)acrylate, isobornyl acrylate, and combinations thereof. Suitable methacrylate compounds include, for example, butyl methacrylate, methyl methacrylate, ethyl methacrylate, isobutyl methacrylate, 2-hydroxyethyl methacrylate, poly(ethylene glycol)methacrylate, poly(propylene glycol)methacrylate, and the like and combinations thereof. Preferred reactive diluents include styrene and butyl acrylate. U.S. Pat. No. 7,037,584 provides additional discussion of suitable materials and methods relating to the use of reactive diluents in low-VOC packaging coating compositions.

Any suitable amount of one or more reactive diluents may optionally be employed in coating composition of the present invention. For example, an amount of one or more reactive diluents sufficient to achieve the VOC content of the aforementioned low-VOC coating compositions may be used. In some embodiments, the coating composition includes at least about 1 wt-%, at least about 5 wt-%, or at least 10 wt-% of polymerized reactive diluent.

In one embodiment, a polymer of the present invention is blended, in any suitable order, with acrylic component (e.g., acrylic resin) and reactive diluent. The polymer and the acrylic component are preferably reacted with one another (although they may be used as a simple blend), either before or after addition of reactive diluents, to form, for example a polyether-acrylate copolymer. The polyether-acrylate and the reactive diluents are preferably further dispersed in water. The reactive diluent is then preferably polymerized in the presence of the polyether-acrylate copolymer to form a coating composition having the desired low VOC content. In this context, the term "reactive diluent" relates to monomers and oligomers that are preferably essentially non-reactive with the resin or any carboxylic acid moiety (or other functional group) that might be present, e.g., on the acrylic resin, under contemplated blending conditions. The reactive diluents are also preferably capable of undergoing a reaction to form a polymer, described as an interpenetrating network with the polymer of the present invention, or with unsaturated moieties that may optionally be present, e.g., on an acrylic resin.

The resulting polymers disclosed above may be formulated with various additional ingredients in the coating composition to provide coatings for rigid or flexible packaging, as well as a variety of other uses. Such optional ingredients may be included in a coating composition to enhance composition esthetics; to facilitate manufacturing, processing, handling, or application of the composition; or to further improve a particular functional property of a coating composition or a cured coating thereof. The optional ingredients should be selected such that they do not adversely affect the coating composition or cured coating thereof. Examples of such optional ingredients include, but are not limited to, anticorrosion agents, antioxidants, adhesion promoters, colorants, coalescents, dispersing agents, dyes, extenders, fillers, flow control agents, lubricants, pigments, thixotropic agents, toners, oxygen-scavenging materials, surfactants, light stabilizers, and mixtures thereof, to provide desired film properties. Each optional ingredient is preferably included in a sufficient amount to serve its intended purpose, but not in such an amount to adversely affect a coating composition or a cured coating thereof The disclosed coating compositions preferably also provide thermoset coatings, and if need be include crosslinkers or other ingredients that impart to or enable thermoset properties in the coating composition.

In some embodiments, the coating compositions may include one or more optional crosslinkers or curing agents that react with the polymer during the curing process. In such examples, the disclosed polymers may include one of more suitable reactive groups (for example, epoxy groups, phenoxy groups or unsaturated groups, hydroxyl groups, carboxyl groups, and the like), that react with the crosslinker or curing agent. The choice of a particular crosslinker or curing agent typically depends on the particular product being formulated. For example, some coating compositions are highly colored (e.g., gold-colored coatings). These coatings may typically be formulated using crosslinker or curing agents that themselves tend to have a yellowish color. In contrast, white coatings are generally formulated using non-yellow or non-yellowing crosslinkers, or only a small amount of a yellow or yellowing crosslinker. Suitable examples of such crosslinker or curing agents include hydroxyl-reactive curing resins such as phenoplasts, aminoplast, blocked or unblocked isocyanates, acidic oligomers, polyamines, polyaminoamides; carboxyl-reactive curing groups such as, e.g., beta-hydroxyalkyl-amide crosslinkers; and mixtures thereof.

Exemplary phenoplast resins include the condensation products of aldehydes with phenols. Formaldehyde and acetaldehyde are preferred aldehydes. Various phenols can be employed including phenol, cresol, p-phenylphenol, p-tert-butylphenol, p-tert-amylphenol and cyclopentylphenol.

Exemplary aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

Exemplary other generally suitable curing agents include blocked or non-blocked aliphatic, cycloaliphatic or aromatic di-, tri-, or polyvalent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates having an Mn of at least about 300, more preferably at least about 650, and even more preferably at least about 1,000 may be used. Polymeric blocked isocyanates are useful in certain embodiments. Exemplary polymeric blocked isocyanates include a biuret or isocyanurate of a diisocyanate, a trifunctional "trimer", or a mixture thereof. Commercially available blocked polymeric isocyanates include TRIXENE™ BI 7951, TRIXENE BI 7984, TRIXENE BI 7963, TRIXENE BI 7981 (available from Baxenden Chemicals, Ltd., Accrington, Lancashire, England); DESMODUR™ BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (available from Bayer Corp., Pittsburgh, PA, USA); and combinations thereof. Exemplary trimers include a trimerization product prepared from on average three diisocyanate molecules or a trimer prepared from on average three moles of diisocyanate (e.g., HMDI) reacted with one mole of another compound such as, for example, a triol (e.g., trimethylolpropane).

Other suitable curing agents may include benzoxazine curing agents such as, for example, benzoxazine-based phenolic resins. Examples of benzoxazine-based curing agents are provided in U.S. Patent Application Publication No. US 2016/0297994 A1. Additionally, or alternatively, alkanolamide-type curing agents may also be used including, but not limited to, beta-hydroxyalkyl-amide crosslinkers such as those sold under the PRIMID trademark (e.g., the PRIMID XL-552 and QM-1260 products) by EMS-CHEMIE AG.

The level of curing agent (viz., crosslinker) used will typically depend on the type of curing agent, the time and temperature of the bake, and the molecular weight of the disclosed polymer in the coating composition. If used, the crosslinker may be present in an amount of up to 50 wt. %, preferably up to 30 wt. %, and more preferably up to 15 wt. % based on the total weight of the resin solids in the coating composition. If used, a crosslinker is preferably present in an amount of at least 0.1 wt. %, more preferably at least 1 wt. %, and even more preferably at least 1.5 wt. % based upon the total resin solids weight.

Another useful optional ingredient is a lubricant (e.g., a wax), which facilitates manufacture of fabricated metal articles (e.g., container closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt. %, and preferably no greater than 2 wt. %, and more preferably no greater than 1 wt. %, based on the total weight of nonvolatile material in the coating composition.

Another useful optional ingredient is a pigment, such as titanium dioxide. If used, a pigment is present in the disclosed coating composition in an amount of no greater than 70 wt. %, more preferably no greater than 50 wt. %, and even more preferably no greater than 40 wt. %, based on the total weight of solids in the coating composition.

Surfactants may optionally be added to the disclosed coating compositions to aid in flow and wetting of a substrate. Examples of surfactants include, but are not limited to, nonylphenol polyethers and salts and similar surfactants known to persons having ordinary skill in the art. If used, a surfactant is preferably present in an amount of at least 0.01 wt. %, and more preferably at least 0.1 wt. %, based on the weight of resin solids. If used, a surfactant is preferably present in an amount no greater than 10 wt. %, and more preferably no greater than 5 wt. %, based on the weight of resin solids.

In some embodiments, the coating composition may include an optional catalyst to increase the rate of cure. Examples of catalysts, include, but are not limited to, strong acids (e.g., phosphoric acid, dodecylbenzene sulphonic acid (DDBSA), available as CYCAT 600 from Cytec), methane sulfonic acid (MSA), p-toluene sulfonic acid (pTSA), dinonylnaphthalene disulfonic acid (DNNDSA), and triflic acid); quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts that will be familiar to persons skilled in the art. If used, a catalyst is preferably present in an amount of at least 0.01 wt. %, and more preferably at least 0.1 wt. %, based on the weight of the dry solids in the thermoset undercoating composition. If used, a catalyst is preferably present in an amount of no greater than 3 wt. %, and more preferably no greater than 1 wt. %, based on the weight of the dry solids in the thermoset undercoating composition.

Preferred coating compositions are substantially free of BPA and its diglycidyl ether, substantially free of BPF and its diglycidyl ether, substantially free of BPS and its diglycidyl ether, and substantially free of other bisphenol or bisphenol DGEs that have an estrogenic activity greater than BPS. More preferably, the disclosed coating compositions are essentially free of each of these compounds, and most preferably they are completely free each of these compounds. Additionally, or alternatively, the polymer and resultant coating include less than 50 ppm of global migratories as described under Global Extractions testing procedures.

Even more preferably, the coating composition is substantially free of, completely free of or does not contain any structural units derived from a dihydric phenol, or other polyhydric phenol, having estrogenic agonist activity greater than 4,4'-(propane-2,2-diyl)bis(2,6-dibromophenol). Optimally, the coating composition is substantially free of, completely free of or does not contain any structural units derived from a dihydric phenol, or other polyhydric phenol, having estrogenic agonist activity greater than 2,2-bis(4-hydroxyphenyl)propanoic acid.

The disclosed coating compositions may be coated on a substrate as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating thickness of from about 2 micrometers to about 60 micrometers, about 2 micrometers to 20 micrometers, and more typically from about 3 micrometers to about 12 micrometers.

Packaging coatings should preferably be capable of high-speed application to the substrate and provide the necessary properties when hardened to perform in this demanding end use. For example, a coating should have excellent adhesion to the substrate, resist abrasion, staining, and other coating defects such as “popping,” “blushing” or “blistering,” and resist degradation over long periods of time, even when exposed to harsh environments. In addition, the coating should generally be capable of maintaining suitable film integrity during container fabrication and be capable of withstanding the processing conditions that the container may be subjected to during product packaging.

The disclosed coating compositions may be applied to a substrate either prior to, or after, the substrate is formed into an article such as, for example, a food or beverage container or a portion thereof. For example, in some embodiments the disclosed coating compositions may be applied as a liquid (e.g., via spray application) to a metal substrate. In some embodiments, the metal substrate may be in the form of part of a food or beverage container and the coating composition applied thereto and cured. In some such embodiments, the coating compositions may be spray applied to the inner surface or food contact surface of the container and cured using UV or elevated temperature conditions.

The metal substrate that receives the disclosed coating composition may have a average thickness of about 0.14 millimeters (mm) to about 0.50 mm. Such thicknesses may be particularly suited for food or beverage containers.

In other embodiments, the coating composition may be applied and dried or hardened on a metal substrate (e.g., applying the composition to the metal substrate in the form of a planar coil or sheet). A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as two-piece drawn food cans, three-piece food cans, food can ends, drawn and ironed cans, beverage can ends, and the like. The coil substrate may be formed after coating and cured by, for example, stamping or drawing the coil into packaging container or a portion thereof (e.g., a food or beverage can or a portion thereof with the coating applied to an inner surface). If metal coil is the substrate to be coated, curing of the applied coating composition may be conducted, for example, by heating the coated metal substrate over a suitable time period to a peak metal temperature ("PMT") of preferably greater than about 350° F. (177° C.). More preferably, the coated metal coil is heated for a suitable time period (e.g., about 5 to 900 seconds) to a PMT of at least about 425° F. (218° C.).

The disclosed polymers and resultant coatings are especially desirable for use on the inside or interior portion of food or beverage containers, and for other applications involving a food or beverage contact surface or involving a metal substrate. Exemplary applications include two-piece drawn food cans, three-piece food cans, food can ends, drawn and ironed food or beverage cans, beverage can ends, easy open can ends, twist-off closure lids, and the like. Thus, in a preferred embodiment, the coating composition forms a continuous interior can coating.

After applying the coating composition onto a substrate, the composition can be cured using a variety of processes, including, for example, oven baking by either conventional or convectional methods at elevated temperature, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions for the disclosed coating compositions once applied to a substrate vary depending upon the method of application and the intended end use. The curing process may be performed at any suitable temperature, including, for example, oven temperatures in the range of from about 100° C. to about 300° C., and more typically from about 177° C. to about 250° C. If a metal substrate is the material being coated (e.g., metal substrates for food or beverage containers), curing of the applied coating composition may be conducted, for example, by heating the coated metal substrate over a suitable time period to a peak metal temperature ("PMT") of preferably greater than about 177° C. More preferably, the coated metal substrate is heated for a suitable time period (e.g., about 5 to 900 seconds) to a PMT of at least about 218° C.

The resultant coated food-contact surfaces of metal packaging containers and metal closures of the present disclosure may be particularly desirable for packaging liquid-containing products. Packaged products that are at least partially liquid in nature (e.g., wet) place a substantial burden on coatings due to intimate chemical contact with the coatings. Such intimate contact can last for months, or even years. Furthermore, the coatings may be required to resist pasteurization or cooking processes during packaging of the product. In the food or beverage packaging realm, examples of such liquid-containing products include beer, alcoholic ciders, alcoholic mixers, wine, soft drinks, energy drinks, water, water drinks, coffee drinks, tea drinks, juices, meat-based products (e.g., sausages, meat pastes, meat in sauces, fish, mussels, clams, etc.), milk-based products, fruit-based products, vegetable-based products, soups, mustards, pickled products, sauerkraut, mayonnaise, salad dressings, and cooking sauces. Coatings for "wet" products may require a more stringent balance of coating properties necessary for use with such goods compared to other coating applications (e.g., interior coating for dry food products) or coating locations (e.g., exterior coating for food or beverage containers).

Although containers of the present disclosure may be used to package dry powdered products that tend to be less aggressive in nature towards packaging coatings (e.g., powdered milk, powdered baby formula, powdered creamer, powdered coffee, powdered cleaning products, powdered medicament, etc.), due to the higher volumes in the marketplace, more typically the coatings may be used in conjunction with more aggressive products that are at least somewhat "wet" in nature. Accordingly, packaging coatings formed from coating compositions of the present disclosure are preferably capable of prolonged and intimate contact, including under harsh environmental conditions, with packaged products having one or more challenging chemical features, while protecting the underlying metal substrate from corrosion and avoiding unsuitable degradation of the packaged product (e.g., unsightly color changes or the introduction of odors or off flavors). Examples of such challenging chemical features include water, acidity, fats, salts, strong solvents (e.g., in cleaning products, fuel stabilizers, or certain paint products), aggressive propellants (e.g., aerosol propellants such as certain dimethyl-ether-containing propellants), staining characteristics (e.g., tomatoes), or combinations thereof.

In certain embodiments, as a general guide to minimize potential concerns, e.g., taste and toxicity concerns, a hardened coating formed from the disclosed coating composition includes, if it includes any detectable amount, less than 50 ppm, less than 25 ppm, less than 10 ppm, or less than 1 ppm, extractables, if any, when tested pursuant to the Global Extraction Test described in the Examples Section. An example of these testing conditions is exposure of the hardened coating to 10 wt-% ethanol solution for two hours at 121° C., followed by exposure for 10 days in the solution at 40° C.

In some embodiments, such reduced global extraction values may be obtained by limiting the amount of mobile or potentially mobile species in the hardened coating. This can be accomplished, for example, by using pure, rather than impure reactants, avoiding the use of hydrolyzable components or bonds, avoiding or limiting the use of low molecular weight additives that may not efficiently react into the coating, and using optimized cure conditions optionally in combination with one or more cure additives. This makes the hardened coatings formed from the coating compositions disclosed particularly desirable for use on food-contact surfaces.

In preferred embodiments, the polymers of the present disclosure, and preferably the coating compositions, are not prepared using halogenated monomers (whether free or polymerized), such as chlorinated vinyl monomers. In further preferred embodiments, the coating composition is substantially free of, completely free of or does not contain halogenated monomers.

The present disclosure also provides methods that include causing the coating composition to be used on a metal substrate of metal packaging (e.g., food or beverage containers, general packaging containers, or portions thereof). In some cases where multiple parties are involved, a first party (e.g., the party that manufactures and/or supplies the coating composition) may provide instructions, recommendations, or other disclosures about the food or beverage container coating end use to a second party (e.g., a metal coater (e.g., a coil coater for beverage can ends), can maker, or brand owner). Such disclosures may include, for example, instructions, recommendations, or other disclosures relating to coating a metal substrate for subsequent use in forming packaging containers or portions thereof, coating a metal substrate of pre-formed containers or portions thereof, preparing coating compositions for such uses, cure conditions or process-related conditions for such coatings, or suitable types of packaged products for use with resulting coatings. Such disclosures may occur, for example, in technical data sheets (TDSs), safety data sheets (SDSs), regulatory disclosures, warranties or warranty limitation statements, marketing literature or presentations, or on company websites. A first party making such disclosures to a second party shall be deemed to have caused the coating compositions to be used on a metal substrate of metal packaging (e.g., a container or portion thereof) even if it is the second party that actually applies the composition to a metal substrate in commerce, uses such coated substrate in commerce on a metal substrate of packaging containers, and/or fills such coated containers with product.

The disclosed coatings may possess sufficient coating properties for use in food or beverage coating systems. Such coatings should exhibit sufficient adhesion (e.g., a score of 10 according to Adhesion testing described below), adequate flexibility (e.g., a score of at least 75% according to the Wedge Bend test); and a low amount of extractions (e.g., less than 50 ppm extractables pursuant to the Global Extraction Test), as well as an absence of other undesirable properties or failure modes (e.g., imparting foul or off-flavors or including unsuitable substances for food-contact).

The disclosed coatings, coating compositions, and polymers disclosed herein may be evaluated using a variety of tests including:

Differential Scanning Calorimetry

Samples for differential scanning calorimetry ("DSC") testing were prepared by first applying the liquid resin composition onto aluminum sheet panels. The panels were then baked in a Fisher ISOTEMP™ electric oven for 20 minutes at 149° C. (300° F.) to remove volatile materials. After cooling to room temperature, the samples were scraped from the panels, weighed into standard sample pans and analyzed using the standard DSC heat-cool-heat method. The samples were equilibrated at −60° C., then heated at 20° C. per minute to 200° C., cooled to −60° C., and then heated again at 20° C. per minute to 200° C. Glass transitions were calculated from the thermogram of the last heat cycle. The glass transition was measured at the inflection point of the transition.

Solvent Resistance

The extent of "cure" or crosslinking of a coating may be measured as a resistance to solvents, such as methyl ethyl ketone (MEK) or isopropyl alcohol (IPA). This test is performed as described in ASTM D5402-93. The number of double-rubs (i.e., one back- and forth motion) is reported.

Global Extractions

The global extraction test is designed to estimate the total amount of mobile material that can potentially migrate out of a coating and into food packed in a coated can. Typically, a coated substrate is subjected to water or solvent blends under a variety of conditions to simulate a given end use. Acceptable extraction conditions and media can be found in 21 CFR section 175.300, paragraphs (d) and (e). The current allowable global extraction limit as defined by this FDA regulation is 50 parts per million (ppm). Extraction may be evaluated using the procedure described in 21 CFR section 175.300, paragraph (e) (4) (xv) but with the following modifications to ensure worst-case scenario performance: 1) the alcohol content is increased to 10% by weight and 2) the filled containers are held for a 10-day equilibrium period at 37.8° C. These modifications are per the FDA publication "Guidelines for Industry" for preparation of Food Contact Notifications. In some embodiments, a coated beverage can is filled with 10 wt. % aqueous ethanol and subjected to pasteurization conditions (65.6° C.) for 2 hours, followed by a 10-day equilibrium period at 37.8° C. Determination of the amount of extractives is determined as described in 21 CFR section 175.300, paragraph (e) (5), and ppm values are calculated based on surface area of the can (no end) of 283.9 $cm^2$ with a volume of 355 milliliters (ml). Preferred coatings give global extraction results of less than 50 ppm, more preferred results of less than 10 ppm, and even more preferred results of less than 1 ppm. Most preferably, the global extraction results are optimally non-detectable.

Additionally, or alternatively, single-sided extraction cells are made according to the design found in the Journal of the Association of Official Analytical Chemists, 47(2):387 (1964), with minor modifications. The cell is 9"×9"×0.5" with a 6"×6" open area in the center of the TEFLON spacer. This allows for 36 $in^2$ or 72 $in^2$ of test article to be exposed to the food simulating solvent. The cell holds 300 mL of food simulating solvent. The ratio of solvent to surface area is then 8.33 mL/in2 and 4.16 mL/in2 when 36 $in^2$ and 72 $in^2$ respectively of test article are exposed.

For the purpose of this invention, the test articles consist of 0.0082-inch-thick 5182 aluminum alloy panels, pretreated with Permatreat® 1903 (supplied by Chemetall GmbH, Frankfurt am Main, Germany). These panels are coated with the test coating (completely covering at least the 6"×6" area required to fit the test cell) to yield a final, dry film thickness of 11 grams per square meter (gsm) following a 10 second curative bake resulting in a 242° C. peak metal temperature (PMT). Two test articles are used per cell for a total surface area of 72 $in^2$ per cell. The test articles are extracted in quadruplicate using 10% aqueous ethanol as the food-simulating solvent. The test articles are processed at 121° C. for two hours, and then stored at 40° C. for 238 hours. The test solutions are sampled after 2, 24, 96 and 240 hours. The test article is extracted in quadruplicate using the 10% aqueous ethanol under the conditions listed above.

Each test solution is evaporated to dryness in a pre-weighed 50 mL beaker by heating on a hot plate. Each beaker is dried in a 250° F. (121° C.) oven for a minimum of 30 minutes. The beakers are then placed into a desiccator to cool and then weighed to a constant weight. Constant weight is defined as three successive weighings that differ by no more than 0.00005 g.

Solvent blanks using Teflon sheet in extraction cells are similarly exposed to stimulant and evaporated to constant weight to correct the test article extractive residue weights for extractive residue added by the solvent itself. Two solvent blanks are extracted at each time point and the average weight is used for correction.

Total nonvolatile extractives are then calculated as follows:

$Ex=es$ where: Ex=Extractive residues ($mg/in^2$); e=Extractives per replicate tested (mg); and s=Area extracted ($in^2$). Preferred coatings give global extraction results of less than 50 ppm, more preferred results of less than 10 ppm, even more preferred results of less than 1 ppm. Most preferably, the global extraction results are optimally non-detectable.

Adhesion

Adhesion testing may be performed to assess whether the coating adheres to the coated substrate. The adhesion test is performed according to ASTM D3359, Test Method B, using SCOTCH™ 610 tape (available from 3M Company of Saint Paul, Minnesota). Adhesion is generally rated on a scale of 0-10 where a rating of “10” indicates no adhesion failure, a rating of “9” indicates 90% of the coating remains adhered, a rating of “8” indicates 80% of the coating remains adhered, and so on. Adhesion ratings of 10 are typically desired for commercially viable coatings.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale of 0-10 where a rating of “10” indicates no blush and a rating of “0” indicates complete whitening of the film. Blush ratings of at least 7 are typically desired for commercially viable coatings and optimally 9 or above.

Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. Testing is accomplished by subjecting the coated substrate to heat ranging from 105° C. to 130° C. and pressure ranging from 0.7 $kg/cm^2$ to 1.05 $kg/cm^2$ for a period of 15 minutes to 90 minutes. For the present evaluation, the coated substrate may be immersed in deionized water and subjected to heat of 121° C. and pressure of 1.05 $kg/cm^2$ for a period of 90 minutes. The coated substrate may then be tested for adhesion and blush as described above. In food or beverage applications requiring retort performance, adhesion ratings of 10 and blush ratings of at least 7 are typically desired for commercially viable coatings.

Wedge Bend Test

Coating flexibility may be evaluated using an ERICHSEN™ Model 471 Bend and Impact Tester (available from Erichsen GmbH & Co. KG) and the manufacturer's recommended test procedure, except that the coated panels are 8×12 cm rather than 5×14 cm. The results are reported as the unruptured coating length as a percent of the overall coating fold line. In general, a value of at least 75% represents good performance and a value of 90% or more represents excellent performance.

End Fabrication

This test is a measure of fabrication ability of a coating. Standard (e.g., size 206 (57 mm diameter), size 307 (83 mm diameter), or any other convenient size) can ends are formed in a press from coated steel plate. The ends are evaluated for initial failure. The ends are then soaked for 10 minutes in a copper sulfate solution containing 69 parts deionized water, 20 parts anhydrous copper sulfate, 10 parts concentrated hydrochloric acid and 1 part DOWFAX™ 2A1 surfactant (available from Dow Chemical Company). The percentage of the end circumference that is uncorroded is recorded.

End Coating Porosity

This test is a measure of coating porosity after forming. Coated can ends are prepared as described above. The ends are immersed in various solutions and subjected to retort conditions as described above. An electrode is placed atop the coating and a milliamp meter is used to measure current flow from the substrate to the electrode. The results are reported in milliamps of current flow.

Food Simulant Tests

The resistance properties of stamped can ends formed from coated plate may be evaluated by processing (retorting) them in three food simulants for 60 minutes at 121° C. and 1.05 $kg/cm^2$. The three food simulants may for example be deionized water, a 1% by weight solution of lactic acid in deionized water and a solution of 2% sodium chloride and 3% acetic acid by weight in deionized water. An additional simulant, 2% sodium chloride in deionized water, is processed for 90 minutes at 121° C. and 1.05 $kg/cm^2$. Adhesion tests are performed as described above. Blush and corrosion are rated visually.

Estrogenic Activity

The MCF-7 assay is a useful test for assessing whether a polyhydric phenol compound is appreciably non-estrogenic. The MCF-7 assay uses MCF-7, clone WS8, cells to measure whether and to what extent a substance induces cell proliferation via estrogen receptor (ER)-mediated pathways. The method is described in “Test Method Nomination: MCF-7 Cell Proliferation Assay of Estrogenic Activity” submitted for validation by CertiChem, Inc. to the National Toxicology Program Interagency Center for the Evaluation of Alternative Toxicological Methods (NICEATM) on Jan. 19, 2006 (available online at http://iccyam.niehs.nih.gov/methods/endocrine/endodocs/SubmDoc.pdf).

A brief summary of the method of the aforementioned MCF-7 assay is provided below. MCF-7, clone WS8, cells are maintained at 37° C. in RMPI (or Roswell Park Memorial Institute medium) containing Phenol Red (e.g., GIBCO Catalog Number 11875119) and supplemented with the indicated additives for routine culture. An aliquot of cells maintained at 37° C. are grown for 2 days in phenol-free media containing 5% charcoal stripped fetal bovine serum in a 25 $cm^2$ tissue culture flask. Using a robotic dispenser such as an epMotion 5070 unit, MCF-7 cells are then seeded at 400 cells per well in 0.2 ml of hormone-free culture medium in Corning 96-well plates. The cells are adapted for 3 days in the hormone-free culture medium prior to adding the chemical to be assayed for estrogenic activity. The media containing the test chemical is replaced daily for 6 days. At the end of the 7-day exposure to the test chemical, the media is removed, the wells are washed once with 0.2 ml of HBSS (Hanks' Balanced Salt Solution), and then assayed to quantify amounts of DNA per well using a micro-plate modification of the Burton diphenylamine (DPA) assay, which is used to calculate the level of cell proliferation. Examples of appreciably non-estrogenic polyhydric phenols include polyhydric phenols that, when tested using the MCF-7 assay, exhibit a Relative Proliferative Effect ("RPE") having a logarithmic value (with base 10) of less than that of BPS or less than about −2.0, more preferably an RPE of −3 or less, and even more preferably an RPE of −4 or less. RPE is the ratio between the EC50 of the test chemical and the EC50 of the control substance 17-beta estradiol times 100, where EC50 is "effective concentration 50%" or half-maximum stimulation concentration for cell proliferation measured as total DNA in the MCF-7 assay.

The following examples are offered to aid in understanding the disclosed compounds, compositions and methods and are not to be construed as limiting the scope thereof. Unless otherwise indicated, all parts and percentages are by weight.

EXAMPLES

Comparative Example 1. Preparation of Non-Spirocyclic Containing Polyester Base A round-bottomed 3-liter flask fitted with a glycol column to remove the water of reaction was charged with the following: 2-methyl-1,3-propanediol (209.9 grams ("g"); cyclohexane-1,4-dimethanol (453.3 g of a 90% solution in water); isophthalic acid (228.7 g); terephthalic acid (114.5 g); and dibutyl tin oxide (1.3 g). The flask was fitted with a thermocouple, heating mantle, and nitrogen flow. Under agitation, the mixture was heated to 230° C. while removing water during heating. The completion of this stage was monitored via acid number and considered complete when an acid number of 5.0 or less was achieved. Once the acid number was achieved, the batch was cooled to 170° C. and maleic anhydride (259.5 g) was then added to the batch.

The batch was reheated to 170° C. after the addition and held for 1 hour at temperature. Upon completion of the hold the column was replaced with a Dean-Stark trap filled with xylene and xylene was added to the batch to reduce the solids to 94%. The batch was then reheated to 210° C. while removing water, the acid number and hydroxyl delta were monitored. The hydroxyl delta target was maintained at 45.0 with the addition of MP DIOL (2-methyl-1,3-propanediol) as necessary. The reaction was continued until an acid number of 5.0 or less was determined. Once the acid number was achieved, the batch was reduced to 60% solids with the addition of Aromatic 150 solvent while allowing the batch to cool. The material produced had a determined Mn of 3330.

Comparative Example 2. Preparation of Non-Spirocyclic Containing Polyester Base To a round-bottomed 1-liter flask fitted with a condenser was charged 200.0 g of the material from Comparative Example 1, Pyromellitic dianhydride (5.1 g) was also charged and the batch heated under agitation to 120° C. Once at 120° C. the batch was held for 3 hours. At the end of the 3 hour reaction the batch was allowed to cool while adding aromatic 150 solvent (2.7 g) and cyclohexanone solvent (72.3 g). The material produced had a solids of 47.0%, an acid number of 23.0, a determined Mn of 3400, and a Tg of 39° C.

Example 1: Synthesis of Pentaspiroglycol Diglycidyl Ether (PSG DGE)

To a 4-neck flask equipped with a mechanical stirrer, nitrogen inlet, reflux condenser, and a heating mantle equipped with a thermocouple and temperature controlling device, is added 375.3 parts of epichlorohydrin. The setup is purged with nitrogen, stirring is begun and 103.8 parts of pentaspiro glycol (3,9-bis(1,1-dimethyl-2-hydroxyethyl)-2,4,8,10-tetraoxaspiro[5.5]undecane or "PSG") is added.

Once the mixture is homogeneous, the mixture is heated to approximately 85° C., at which time 8.4 parts of a 60% solution of benzyl trimethyl ammonium chloride in water is added over approximately 1 hour to keep the temperature between 85-90° C. After the addition is complete, the mixture is held at 85-90° C. for 4 hours.

The mixture is tested by HPLC for residual PSG on the hour. When the residual PSG is less than 1% (8 hours), the reactor is cooled to 55° C., and 79 parts of 25% aqueous sodium hydroxide is added and held with agitation for 1 hour at approximately 55° C. Agitation is stopped and the layers are allowed to separate. When a relatively clean interface is observed, the saltwater layer (bottom layer) is removed. Agitation is commenced and the organic layer is equilibrated at 55° C., and 30.4 parts of 25% aqueous sodium hydroxide is added. After agitation at 55° C. for 30 minutes, 36.5 parts of water is added, and held with agitation at 55° C. for 1 hour. Agitation is stopped, and the bottom layer is removed.

The organic layer is tested for hydrolysable chloride content, which is expected to measure less than 0.5% by weight. A vacuum is drawn and when the vacuum reaches approximately 25 in Hg, heat is slowly applied to reach approximately 122° C. The material is tested for the presence of epichlorohydrin. Once the presence of epichlorohydrin is less than 0.2 wt. % (if the value was greater than 0.2%, stripping was continued) vacuum is broken, the mixture is cooled to 55° C., and 250.3 parts of toluene and 30.9 parts isopropanol are added under agitation and heated to 55° C. Next, 14.9 parts of 50% aqueous sodium are added and mixed for 1 hour, then 17.9 parts water are added.

The top layer is tested for hydrolyzable chloride (HCC). If the HCC is less than 0.01 wt. %, the bottom layer is removed (If HCC is greater than 0.01%, additional caustic treatments are performed) and an equal volume of water is added. The two layers are heated to 50° C. with agitation for 30 minutes, at which time, agitation is stopped and the layers are allowed to separate.

The bottom layer is removed and 124.3 parts of a 0.4 wt. % aqueous solution of monosodium phosphate is added. The layers are heated to 50° C. with agitation for 30 minutes. The bottom layer is removed and an equal volume of water is added and heated to 50° C. with agitation for 30 minutes. Agitation is stopped, the layers are allowed to separate, and the aqueous layer is removed. This is repeated until the organic layer is completely clear, indicating all the salt are washed out. At this point the toluene is stripped out at 122° C. under vacuum, leaving the PSG DGE with the following expected properties:

Epoxide equivalent weight=210.1 grams/equivalent
HCC content=0.01 wt. %
Water content=0.01 wt. %
Epichlorohydrin content=6.1 ppm
Form=light brown solid
Melting point=100° C.

Example 2: Synthesis of a Polymer Based on PSG DGE and Hydroquinone 40.94 parts of PSG DGE of Example 1, 9.75 parts of hydroquinone, 0.05 parts polymerization catalyst, and 2.66 parts methylisobutyl ketone are added to a 4-neck round-bottom flask equipped with a mechanical stirrer. The system is connected to a nitrogen inlet to maintain a nitrogen blanket, a water-cooled condenser, and a thermocouple connected to a heating control device and a heating mantle.

This mixture is heated with stirring to 125° C., allowed to exotherm, and is then heated at 160° C. for 3 hours until the epoxy value is 0.032 eq/100 g. Next 48 parts cyclohexanone is added and the mixture is let cooled to 70° C. The batch is discharged affording a solvent-based polymer with a non-volatile content of about 50% and an expected epoxy value of 0.030 eq/100 grams.

The epoxy is formulated into a epoxy phenolic resin, and cured on electroplated tin at 205° C. for 10 minutes. The adhesion, flexibility, and corrosion resistance are expected to be comparable to similar formulations based on BPA or tetramethyl bisphenol F ("TMBPF").

Example 3. Preparation of PSG Containing Polyester Base

A round-bottomed 3-liter flask fitted with a glycol column to remove the water of reaction was charged with the following: MP DIOL (95.0 g); cyclohexane-1,4-dimethanol (372.8 g of a 90% solution in water); isophthalic acid (143.1 g); terephthalic acid (72.0 g); and Dibutyl tin oxide (1.2 g). The flask was fitted with a thermocouple, heating mantle, and Nitrogen flow. Under agitation, the mixture was heated to 230° C. while removing water during the heat up. The completion of this stage was monitored via acid number and considered complete when an acid number of 5.0 or less was achieved. Once the acid number of 5.0 or less was achieved, the batch was cooled to 170° C. and maleic anhydride (254.2 g) was then added to the batch. The batch was reheated to 170° C. after the addition and held for 1 hour at temperature the column was replaced with a Dean-Stark trap filled with xylene.

At the conclusion of the hold xylene was added to the batch to reduce the solids to 94% and pentaspiroglyol (290.5 g) was added to the batch under agitation. The batch was then reheated to 200° C. while removing water, the acid number and hydroxyl delta were monitored. The hydroxyl delta target was maintained at 45.0 with the addition of MP DIOL as necessary. The reaction was continued until an acid number of 10.0 or less was determined.

Once the acid number was achieved, the batch was reduced to 60% solids with the addition of Aromatic 150 solvent while allowing the batch to cool. The material produced had a determined Mn of 2920.

Example 4: Preparation of PSG Containing Polyester Base

To a round-bottomed 1-liter flask fitted with a condenser was charged 200.0 g of the material from Example 3, pyromellitic dianhydride (5.1 g) was also charged and the batch heated under agitation to 120° C. Once at 120° C. the batch was held for 3 hours. At the end of the 3 hour reaction the batch was allowed to cool while adding aromatic 150 solvent (2.7 g) and cyclohexanone (72.3 g).

The material produced had a solids of 47.0% an acid number of 26.0 a determined Mn of 3660 and a Tg of 58° C.

Example 5. Preparation of PSG Containing Polyester Base

A round-bottomed 3-liter flask fitted with a glycol column to remove the water of reaction was charged with the following: MP DIOL (64.3 g); cyclohexane-1,4-dimethanol (336.7 g of a 90% solution in water); isophthalic acid (144.5 g); terephthalic acid (72.3 g); and Dibutyl tin oxide (1.2 g). The flask was fitted with a thermocouple, heating mantle, and Nitrogen flow. Under agitation, the mixture was heated to 230° C. while removing water during the heat up. The completion of this stage was monitored via acid number and considered complete when an acid number of 5.0 or less was achieved. Once the acid number was achieved, the batch was cooled to 170° C. and nadic anhydride (321.4 g) was then added to the batch.

The batch was reheated to 170° C. after the addition and held for 1 hour at temperature the column was replaced with a Dean-Stark trap filled with xylene. At the conclusion of the hold xylene was added to the batch to reduce the solids to 94% and PSG (268.9 g) was added to the batch under agitation.

The batch was then reheated to 200° C. while removing water, the acid number and hydroxyl delta were monitored. The hydroxyl delta target was maintained at 45.0 with the addition of MP DIOL as necessary. The reaction was continued until an acid number of 15.0 or less was determined.

Once the acid number was achieved, the batch was reduced to 60% solids with the addition of Aromatic 150 solvent while allowing the batch to cool. The material produced had a determined Mn of 2350.

Example 6

To a round-bottomed 1-liter flask fitted with a condenser was charged 148.0 g of the material from Example 3, pyromellitic dianhydride (3.6 g) was also charged and the batch heated under agitation to 120 C. Once at 120 C the batch was held for 3 hours. At the end of the 3 hour reaction the batch was allowed to cool while adding butanol solvent (6.0 g) and cyclohexanone (46.7 g).

The material produced had a solids of 50.0% an acid number of 28.3 a determined Mn of 3590 and a Tg of 81° C.

Example 7: Tg Testing

A control polyester containing maleic anhydride was prepared without pentaspiroglycol (PSG) and yielded a Tg of 26° C. This base polyester was then extended with Pyromelliticdianhydride (PMDA) and yielded a polyester with a Tg of 44° C.

A similar system was prepared containing 24 wt. % PSG. The base polyester yielded a Tg of 44° C. This base polyester was then extended with PMDA to yield a polyester with a Tg of 58° C.

Having thus described preferred embodiments of the disclosed compounds, compositions and methods, those of skill in the art will readily appreciate that the teachings found herein may be applied to yet other embodiments within the scope of the claims hereto attached. The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A food or beverage container, or portion thereof, comprising:

a metal substrate comprising an inner surface;

a coating on at least a portion of the inner surface substrate, the coating formed from a coating composition comprising a polyether polymer having one or more spirocyclic segments optionally containing heterocyclic aliphatic groups, wherein the polyether polymer is formed from reactants comprising (a) one or more polyepoxide(s) comprising the one or more spirocyclic segments optionally containing heterocyclic aliphatic groups, and (b) an extender comprising at least two reactive groups capable of reacting with oxirane groups of the polyepoxide, optionally wherein the at least two reactive groups comprise acid groups, hydroxyl groups, amine groups, or a combination thereof, optionally wherein the extender includes one or more aryl or heteroaryl groups.

2. The food or beverage container of claim 1, wherein the one or more spirocyclic segments are segments of the below Formula I:

Formula I

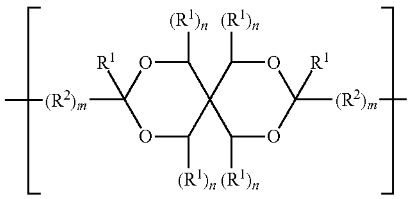

wherein:

each $R^1$ is independently an atom or an organic group;

each $R^{2,}$ if present, is independently a multivalent organic group;

n is independently 1 or 2, where when n is 1 the respective $R^1$ group is attached via a double bond;

m is independently 0 or 1; and optionally, two or more $R^1$ or $R^2$ groups can join to form a cyclic or polycyclic group.

3. The food or beverage container of claim 1 wherein the polyether copolymer is a polyether-ester copolymer or a polyether-acrylic copolymer.

4. The food or beverage container of claim 1 wherein the at least two reactive groups of the extender comprise acid groups, hydroxyl groups, amine groups, or a combination thereof.

5. The food or beverage container of claim 4, wherein the extender comprises catechol, substituted catechol, hydroquinone, substituted hydroquinone, resorcinol, substituted resorcinol, or a mixture thereof.

6. The food or beverage container of claim 1 wherein the polyepoxide comprises a diepoxide including a segment of the below Formula II:

Formula II

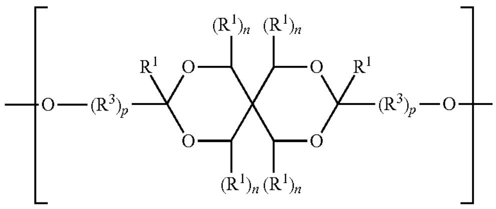

wherein:

each $R^1$ is independently an atom or an organic group;

each $R^3$, if present, is independently a multivalent organic group;

p is independently 0 or 1;

optionally, two or more $R^1$ or $R^3$ groups can join to form a cyclic or polycyclic group; and each O is an ether oxygen.

7. The food or beverage container of claim 1 wherein the polyepoxide is a diepoxide that comprises a diglycidyl ether of: 3,9-bis(1,1-dimethyl-2-hydroxyethyl)-2,4,8, 10-tetraoxaspiro[5.5] undecane or 2,4,8,10-tetraoxaspiro[5.5] undecane-3,9-diylbis(2-methylpropane-2,1-diyl)bis[3-[3-(tert-butyl)-4-hydroxy-5-methylphenyl] propanoate]; or the polyepoxide is a diepoxide that comprises 3,9-bis[4-(oxiran-2-ylmethoxy)phenyl]-2,4,8,10-tetraoxaspiro [5.5] undecane; 3,9-bis [2-methyl-1-(oxiran-2-ylmethoxy)propan-2-yl]-2,4,8,10-tetraoxaspiro[5.5] undecane; or 3,9-bis (oxiran-2-yl)-2,4,8,10-tetraoxaspiro[5.5] undecane.

8. The food or beverage container or method of claim 1, wherein the polyepoxide is a diepoxide formed from reaction of a halohydrin with a diol of the below Formula III:

Formula III

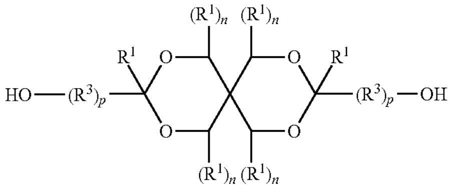

where:

each $R^{1,}$ $R^{3,}$ n, and p is the same as in Formula II, and the diepoxide comprises a diglycidyl ether of the diol of Formula III.

9. The food or beverage container of claim 8, wherein the diol comprises 3,9-bis(1,1-dimethyl-2-hydroxyethyl)-2,4,8, 10-tetraoxaspiro[5.5] undecane.

10. The food or beverage container of claim 6 wherein the diepoxide including the segment of Formula II is present in the ingredients in an amount in the range of 1 wt. % to 70 wt. %, 5 wt. % to 40 wt. %, 10 wt. % to 30 wt. %, or 10 wt. % to 25 wt. %.

11. The food or beverage container of claim 1 wherein the polyether polymer has a Tg of greater than about 70° C.

12. The food or beverage container of claim 1 wherein the polyether polymer has:

(I) a number average molecular weight (Mn) of (a) at least 2,000 Da, at least 3,000 Da, or at least 4,000 Da, or (b) less than 20,000 Da, less than 10,000 Da, less than 8,000 Da, or less than 6,000 Da, or (c) both (a) and (b); and/or (II) a polydispersity index (PDI) in the range of 1.5 to 5, in the range of 2 to 3.5, in the range of 2.2 to 3, or in the range of 2.4 to 2.8.

13. The food or beverage container of claim 1 wherein the coating composition is substantially free of each of bisphenol A, bisphenol F, bisphenol S, and diglycidyl ethers thereof.

14. The food or beverage container of claim 1, wherein the coating has a glass transition temperature in the range of 30° C. to 120° C., 70° C. to 110° C., or 90° C. to 110° C.

15. The food or beverage container of claim 1, wherein the coating has an average coating thickness in the range of 2 µm-20 µm.

16. A method of forming a coated food or beverage container, or portion thereof, comprising:

applying a coating composition to an inner surface of a metal substrate of a food or beverage container, wherein the coating composition comprises a polyether polymer having one or more spirocyclic segments optionally containing heterocyclic aliphatic groups, wherein (I) the polyether polymer is formed from reactants comprising (a) one or more polyepoxide(s) comprising the one or more spirocyclic segments optionally containing heterocyclic aliphatic groups, and (b) an extender comprising at least two reactive groups capable of reacting with oxirane groups of the diepoxide, optionally wherein the at least two reactive groups comprise acid groups, hydroxyl groups, amine groups, or a combination thereof, optionally wherein the extender includes one or more aryl or heteroaryl groups; and curing the coating composition to form a coating on the substrate.

17. The method of claim 16, wherein the polyether polymer is water-dispersible and the coating composition comprises a latex emulsion comprising latex polymer particles optionally formed in the presence of the polyether polymer.

18. The method of claim 16, wherein coating composition further comprises at least one crosslinker configured to react with the polyether polymer when cured.

19. The method of claim 16, wherein curing the coating composition to form a coating on the substrate comprises curing the coating composition at a temperature of at least about 100° C.

* * * * *